(12) United States Patent
Ohya et al.

(10) Patent No.: US 6,676,737 B2
(45) Date of Patent: Jan. 13, 2004

(54) WATER BASED INK COMPOSITION AND IMAGE FORMING METHOD

(75) Inventors: Hidenobu Ohya, Hino (JP); Hitoshi Morimoto, Hino (JP)

(73) Assignee: Konica Corporation (JP)

( * ) Notice: Subject to any disclaimer, the term of this patent is extended or adjusted under 35 U.S.C. 154(b) by 142 days.

(21) Appl. No.: 09/785,001

(22) Filed: Feb. 16, 2001

(65) Prior Publication Data

US 2001/0023652 A1 Sep. 27, 2001

(30) Foreign Application Priority Data

Feb. 17, 2000 (JP) ........................................ 2000-039360

(51) Int. Cl.[7] .............................................. C09D 11/02
(52) U.S. Cl. ................ 106/31.6; 106/31.75; 106/31.77; 106/31.78; 106/31.79
(58) Field of Search ............................ 106/31.6, 31.75, 106/31.77, 31.78, 31.79

(56) References Cited

U.S. PATENT DOCUMENTS

| | | | |
|---|---|---|---|
| 2,662,895 A | 12/1953 | Pedersen | 540/136 |
| 5,428,383 A * | 6/1995 | Shields et al. | 106/31.27 |
| 5,561,232 A * | 10/1996 | Hao et al. | 540/472 |
| 6,001,168 A * | 12/1999 | Hall-Goulle et al. | 106/496 |
| 6,071,989 A * | 6/2000 | Sieber et al. | 106/31.6 |
| 6,102,996 A * | 8/2000 | Parazak | 106/31.25 |
| 6,200,370 B1 * | 3/2001 | Fujiwara et al. | 106/31.48 |

FOREIGN PATENT DOCUMENTS

| | | | |
|---|---|---|---|
| EP | 654711 A1 * | 5/1995 | G03F/7/004 |
| EP | 0742255 | 11/1996 | |
| EP | 0922737 | 6/1999 | |
| JP | 169777 | 6/2000 | |
| WO | WO 9901511 | 1/1999 | |

OTHER PUBLICATIONS

Search Report EP 01 30 1325, 10/01.
Derwent Publication XP–002179417—Abstract only in English, 10/99.
Derwent Publication XP–002179418—Abstract (2 pages) in English, 9/99.

* cited by examiner

*Primary Examiner*—Helene Klemanski
(74) *Attorney, Agent, or Firm*—Muserlian, Lucas and Mercanti

(57) ABSTRACT

A water based ink composition is disclosed. A precursor, which can be converted to an insoluble pigment employing at least one of a chemical means, a thermal means, a photodecomposition means, and a radiation means, is dissolved in a water based solvent in the ink.

21 Claims, No Drawings

WATER BASED INK COMPOSITION AND IMAGE FORMING METHOD

FIELD OF THE INVENTION

The present invention relates to a novel ink composition which results in excellent image quality as well as high image fastness and an image forming method, and in more detail to an ink composition which can be employed in an ink jet recording method and an image forming method which is capable to accomplishing ink jet recording.

BACKGROUND OF THE INVENTION

An ink jet recording method makes it possible to record extremely fine images employing a relatively simple apparatus, and has been increasingly developed in various fields. In broad fields, produced have been printers which utilize ink jet recording systems. Further, a wide variety of ink has been developed depending on need.

Water based ink jet recording compositions are commonly employed for ink jet recording. The water based ink jet recording compositions employed for ink jet recording are mainly divided into dye based ink and pigment based ink.

The dye based ink is highly valued on the market due to its vivid color reproduction as well as its excellent storage stability. On the other hand, it does not sufficiently meet requirements for image retention quality (such as light fastness, minimum bleeding, and the like).

The pigment based ink exhibits higher image retention compared to the dye based ink, but it necessitates a dispersion process for its production. The stability of the resultant dispersion is limited. Therefore, when employing ink jet recording, problems occur such as disadvantages for cost reduction, clogging during use over an extended period of time, and the like. Further, the resultant image quality (such as color reproduction, glossiness, bronzing, and the like) is inferior to dyes.

Under such current situation, demanded have been novel colorants which exhibit the excellent properties of dyes (such as image quality and ink storage stability) and the image retention quality of pigments (such as light fastness, minimum bleeding, and the like).

In recent years, developed has been technology in which specified pigments are subjected to chemical modification so that they become soluble in organic solvents. For example, Japanese Patent Publication Open to Public Inspection No. 7-150068 discloses organic solvent-soluble compounds in which nitrogen atom(s) of pigments such as quinacridone, indigo, and the like, are subjected to chemical modification employing a specified oxycarbonyl group, and further discloses that when the resulting modified compound is subjected to thermal treatment, the original pigment is regenerated (latent pigment technology).

Further, Japanese Patent Publication Open to Public Inspection Nos. 11-246809 and 11-293166 disclose technology in which said latent technology is applied to ink jet recording. However, compounds, which are obtained by substituting disclosed pigments, are only soluble in organic solvents. Thus when ink is prepared, water-insoluble organic solvents are required.

Employed as water-insoluble organic solvents, which are employed to prepare said ink, are low-boiling point and high-boiling point water-insoluble organic solvents. Said low-boiling point water-insoluble organic solvents are not preferred because during printing as well as the drying process, organic solvents volatize to result in adverse effects to humans as well as to the environment. Further, the volatilization of said water-insoluble organic solvents on the printing head results in frequent clogging of the orifice of said head. Still further, when said high-boiling point water-insoluble organic solvents are employed, the drying properties of images are degraded and a large amount of solvent remains. Specifically, when special glossy paper sheets, which are capable of producing high quality, are used, drying properties are further degraded. As a result, when the printed paper sheet is placed on another, parts of the image may be transferred to the reverse surface.

It is a first object of the present invention to provide an ink composition which exhibits storage stability of ink for an extended period of time and results in high image quality as well as sufficient image retention. It is a second object of the present invention to provide a method which forms images exhibiting high image quality as well as sufficient image retention, employing a novel water based ink composition.

The aforementioned objects of the present invention are achieved by the embodiments described below.

(1) A water based ink composition characterized in that a precursor, which can be converted to an insoluble pigment by at least one means selected from a chemical means, a thermal means, a photodecomposition means, and a radiation means, is dissolved in a water based solvent.

(2) The water based ink composition described in (1) above, characterized in that that a precursor, which can be converted to an insoluble pigment by at least one means selected from a chemical means, a thermal means, a photodecomposition means, and a radiation means, is the compound represented by General Formula (1) described below:

General Formula (1)

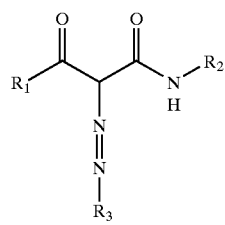

wherein $R_1$ represents an alkyl group or an aryl group which may have a substituent, $R_2$ represents a phenyl group which may have a substituent, and $R_3$ represents a phenyl group which may have a substituent. However, at least one of $R_1$, $R_2$, and $R_3$ is a group represented by General Formulas (2) or (3):

General Formula (2)

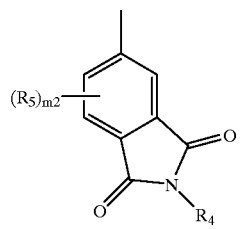

General Formula (3)

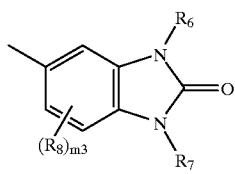

In General Formulas (2) and (3), $R_4$ represents a substituent having a water solubilizing group, $R_5$ represents a substituent, and m2 represent 0 to 3. $R_6$ and $R_7$ each represent a substituent having a water solubilizing group, R8 represents a substituent, and $m_3$ represents 0 to 3.

(3) The water based ink composition described in (1) above, characterized in that that a precursor, which can be converted to an insoluble pigment by at least one means selected from a chemical means, a thermal means, a photodecomposition means, and a radiation means, is the compound represented by General Formula (4) described below:

General Formula (4)

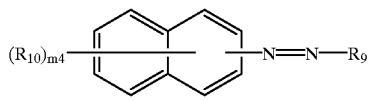

wherein $R_9$ represents a phenyl group which may have a substituent, $R_{10}$ represents a hydroxyl group, or an amino group, an acylamino group or a carbamoyl group which may have a substituent, and $m_4$ represents 0 to 7. However, at least one substituent of $R_9$ or $R_{10}$ is a group represented by General Formula (2) or General Formula (3), or a group $R_9$ or $R_{10}$ mentioned above which is substituted by the group represented by General Formula (2) or (3).

General Formula (2)

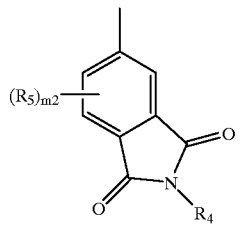

General Formula (3)

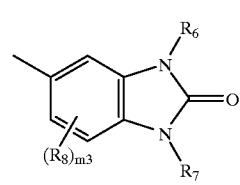

In General Formulas (2) and (3), each of $R_4$, $R_6$ and $R_7$ represents a substituent having a water solubilizing group, each of $R_5$ and $R_8$ represents a substituent, and $m_2$ represents 0 to 3.

(4) The water based ink composition described in (1) above, characterized in that that a precursor, which can be converted to an insoluble pigment by at least one means selected from a chemical means, a thermal means, a photodecomposition means, and a radiation means, is the compound represented by General Formula (5) described below:

General Formula (5)

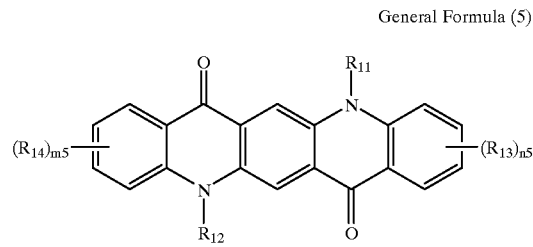

wherein $R_1$1 and $R_{12}$ each represent a substituent having a water solubilizing group, $R_{13}$ and $R_{14}$ each represent a substituent, and $n_5$ and $m_5$ each represent 0 to 4.

(5) The water based ink composition described in (1) above, characterized in that that a precursor, which can be converted to an insoluble pigment by at least one means selected from a chemical means, a thermal means, a photodecomposition means, and a radiation means, is the compound represented by General Formula (6) described below:

General Formula (6)

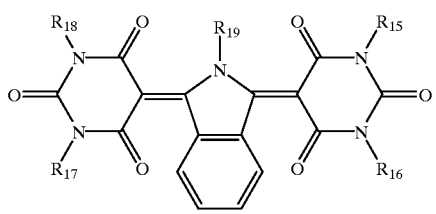

wherein $R_{15}$, $R_{16}$, $R_{17}$, $R_{18}$, and $R_{19}$ each represent a hydrogen atom or a substituent having a water solubilizing group. However, at least two of $R_{15}$, $R_{16}$, $R_{17}$, $R_{18}$, or $R_{19}$ are substituents having a water solubilizing group.

(6) The water based ink composition described in (1) above, characterized in that that a precursor, which can be converted to an insoluble pigment by at least one means selected from a chemical means, a thermal means, a photodecomposition means, and a radiation means, is the compound represented by General Formula (7) described below:

General Formula (7)

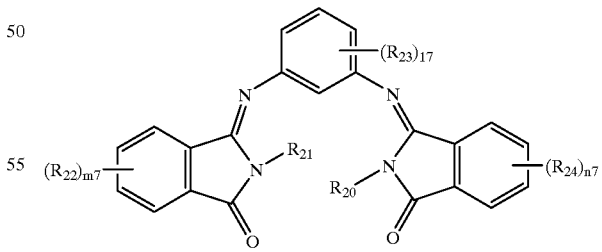

wherein $R_{20}$ and $R_{21}$ each represent a substituent having a water solubilizing group, $R_{22}$, $R_{23}$, and $R_{24}$ each represent a substituent, and $m_7$, $l_7$, and $n_7$ each represent 0 to 4.

(7) The water based ink composition described in (1) above, characterized in that that a precursor, which can be converted to an insoluble pigment by at least one means selected from a chemical means, a thermal means, a photodecomposition means, and a radiation means, is the compound represented by General Formula (8) described below:

General Formula (8)

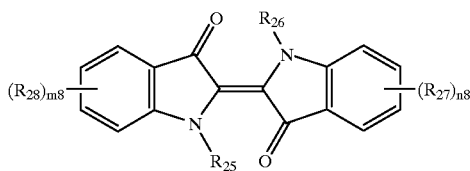

wherein $R_{25}$ and $R_{26}$ each represent a substituent having a water solubilizing group, $R_{27}$, and $R_{28}$ each represent a substituent, and $m_8$ and $n_8$ each represent 0 to 4.

(8) The water based ink composition described in (1) above, characterized in that that a precursor, which can be converted to an insoluble pigment by at least one means selected from a chemical means, a thermal means, a photodecomposition means, and a radiation means, is the compound represented by General Formula (9) described below:

General Formula (9)

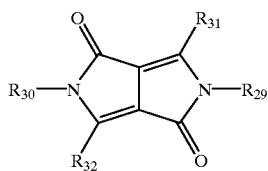

wherein $R_{29}$ and $R_{30}$ each represent a substituent having a water solubilizing group, and $R_{31}$ and $R_{32}$ each represents a hydrogen atom or a substituent.

(9) The water based ink composition described in (1) above, characterized in that that a precursor, which can be converted to an insoluble pigment by at least one means selected from a chemical means, a thermal means, a photodecomposition means, and a radiation means, is the compound represented by General Formula (10) described below:

General Formula (10)

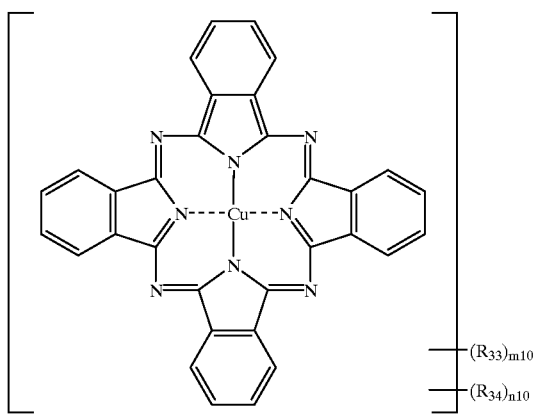

wherein $R_{33}$ represents a substituent having a water solubilizing group, and $R_{34}$ represents a substituent. $m_{10}$ represents 1 to 8 and $n_{10}$ represents 0 to 8.

(10) The water based ink composition described in (1) above, characterized in that that a precursor, which can be converted to an insoluble pigment by at least one means selected from a chemical means, a thermal means, a photodecomposition means, and a radiation means, is the compound represented by General Formula (11) described below:

General Formula (11)

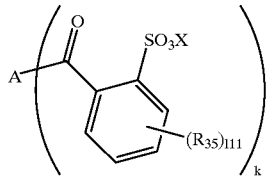

wherein A represents an insoluble pigment residual group; the group in the parenthesis bonds to the nitrogen atom of A; X represents a hydrogen atom or a counter cation; $R_{35}$ represents a substituent; and $l_{11}$ represents 0 to 4. Further, when $l_{11}$ is 2 to 4, a plurality of $R_{35}$ may be joined together to form a ring. "k" represents 1 to 5.

(11) An image forming method characterized in that after carrying out printing on a print medium, employing the water based ink composition described in any of (1) through (10) above, a precursor formed on said print medium, which can be converted to an insoluble pigment by at least one means selected from a chemical means, a thermal means, a photodecomposition means, and a radiation means, is converted to an insoluble pigment by at least one means selected from a chemical means, a thermal means, a photodecomposition means, and a radiation means.

(12) The image forming method described in (11) above, characterized in that said chemical means includes one in which an acid is employed as an acting component and a precursor which can be converted to a insoluble pigment is converted to an insoluble pigment by a means in which a means, in which said acid is employed as an acting component, is combined with a thermal means.

DETAILED DESCRIPTION OF THE INVENTION

The present invention will now be detailed.

Insoluble pigments in precursors (hereinafter occasionally referred to as precursors of the present invention) which can be converted to insoluble pigments by at least one means selected from a chemical means, a thermal means, a photodecomposition means, and a radiation means of the present invention are not particularly limited. The insoluble pigments denote all organic pigments excepting lake pigments obtained from acidic or basic dye and soluble azo pigments (azo lake pigments), and include insoluble azo pigments, condensed azo pigments, phthalocyanine pigments and condensed polycyclic pigments. The classification of solubility can be referred to the description of page 319 of Shikizai Kogaku (Colored Material) Handbook (edited by Shikizai Kyokai, 1st ed., 1989).

Examples include azo pigments, azomethine pigments, methine pigments, diphenylmethane pigments, triphenylmethane pigments, quinacridone pigments, anthraquinone pigments, perylene pigments, indigo pigments, quinophthalone pigments, isoindolinone pigments, isoindoline pigments, azine pigments, oxazine pigments, thiazine pigments, dioxazine pigments, thiazole pigments, phthalocyanine pigments, diketopyrrolopyrrole pigments, and the like.

These pigments may have substituents which include halogen atoms (for example, chlorine atoms and the like); alkyl groups (for example, a methyl group, an ethyl group, a pentyl group, and the like); aryl groups (for example, a phenyl group); heterocyclic ring groups (for example, a pyridyl group, furyl group, thienyl group, and the like); alkoxy groups (for example, a methoxy group, an ethoxy group, a hexyloxy group, and the like); amino group (for example, a dimethylamino group and the like); acylamino groups (for example, an acetylamino group, a propanoylamino group, a benzoylamino group, and the like); sulfonylamino groups (for example, a methanesulfonamido group, benzenesulfonamido group, and the like); and the like.

Insoluble pigments preferred in the present invention include acetanilide based azo pigments, isoindoline pigments, isoindolinone pigments, quinacridone pigments, naphthol azo pigments, pyrrolopyrrole pigments, and phthalocyanine pigments.

Precursors of the present invention are preferably water-soluble compounds. The water-soluble compounds preferably have solubility of 0.5 g or more in 100 ml of water, and more preferably 10 g or less.

A preferred method to allow said precursors to become water-soluble is that at least one chemically modifiable nitrogen atom of said insoluble pigment is subjected to chemical modification and further when said chemical modification is carried out, at least one of introduced groups includes a water solubilizing group.

Listed as introduced groups during said chemical modification are, for example, an acyl group, an oxycarbonyl group, an aminocarbonyl group, a thiocarbonyl group, a sulfonyl group, an aminosulfonyl group, and the like.

The water solubilizing groups are not particularly restricted as far as they give necessary solubility in water-based solvent, and examples are any of the anionic group (for example, $SO_3X$, COOX, and the like wherein X represents a hydrogen atom, or a counter cation); cationic groups (for example, quaternary ammonium salts and the like); and nonionic groups (for example, a group having a polyoxyalkylene structure; a group having a polyhydric alcohol ester structure, and the like). However, anionic groups are preferred, and of them, groups having at least one —$SO_3X$ are more preferred.

As the precursors of the present invention, preferred are compounds represented by General Formulas (1), (4), (5), (6), (7), (8), (9), (10), or (11), described below. The precursors represented by General Formulas (1), (5), (10), and (11) are preferable because of advantage in high saturation, wide color reproduction area and high stability against light, and those represented by General Formulas (4) and (9) are preferable because the water insoluble pigment obtained therefrom are extremely advantageous in high stability against light and red color reproduction.

Compounds represented by General Formulas (1), (4), (5), (6), (7), (8), (9), (10), or (11) will now be described successively.

First, described are the compounds represented by General Formula (1).

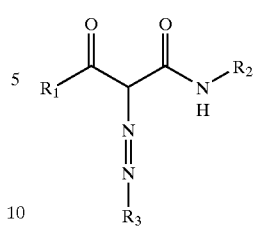

General Formula (1)

wherein $R_1$ represents an alkyl group or an aryl group which may have a substituent, $R_2$ represents a phenyl group which may have a substituent, and $R_3$ represents a phenyl group which may have a substituent. However, at least one of $R_1$, $R_2$, and $R_3$ is a group represented by General Formulas (2) or (3):

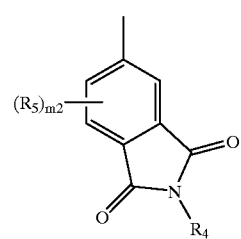

General Formula (2)

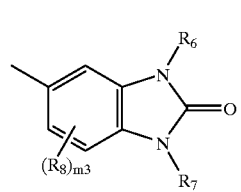

General Formula (3)

In General Formulas (2) and (3), $R_4$ represents a substituent having a water solubilizing group, $R_5$ represents a substituent, and $m_2$ represent 0 to 3. $R_6$ and $R_7$ each represent a substituent having a water solubilizing group, $R_8$ represents a substituent, and $m_3$ represents 0 to 3.

Listed as alkyl groups represented by $R_1$, which may have a substituent in General Formula (1), are, for example, a methyl group, an ethyl group, a t-butyl group, and the like. Listed as aryl groups, which may have a substituent, are, for example, a phenyl group, a p-methoxyphenyl group, and the like. A non-substituted alkyl group and a phenyl group substituted by alkyl group are preferable for $R_1$.

In a phenyl group which may have a substituent represented by $R_2$, listed as substituents which said phenyl group may have, are, for example, alkyl groups (for example, a methyl group, an ethyl group, and the like), alkyloxy groups (for example, a methoxy group, an ethoxy group, and the like), halogen atoms (for example, a fluorine atom, a chlorine atom, and the like), and the like.

In a phenyl group which may have a substituent represented by $R_3$, listed as substituents which said phenyl group may have, are, for example, alkyl groups (for example, a methyl group, an ethyl group, a trifluoromethyl group, and the like); alkyloxy groups (for example, a methoxy group, an ethoxy group, and the like); halogen atoms (for example, a fluorine atom, a chlorine atom, and the like); a nitro group, a carbamoyl groups (for example, a phenylcarbamoyl group, and the like); sulfamoyl groups (for example, phenylsulfamoyl group, and the like); alkyloxycarbonyl group (for example, a methoxycarbonyl group, and the like); and the like.

At least one of $R_1$, $R_2$, and $R_3$ is a group represented by General Formulas (2) or (3). Preferred as substituents having a water solubilizing group represented by $R_4$, $R_6$, and $R_7$ in General Formulas (2) and (3) are those represented by General Formula (12) described below:

General Formula (12)

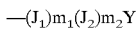

wherein $J_1$ represents a divalent bondable bonding group. Said divalent bonding groups, which are preferred, include —CO—, —COO—, —CONR— (wherein R represents a hydrogen atom or an alkyl group), —CS—, —SO$_2$—, —SO$_2$NR— (wherein R represents a hydrogen atom, or an alkyl group), —CONHSO$_2$—, —S—, —Si—, and the like.

$J_2$ represents a divalent bondable bonding group. Listed as said divalent bonding groups are, for example, an alkylene group, a phenylene group, —O—, —COO—, —OCO—,

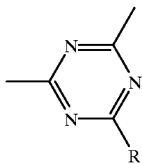

(wherein R represents a substituent such as, for example, a halogen atom, —OH, and the like), and those groups in combination.

Y represents a water solubilizing group. Employed as said water solubilizing groups are any of the anionic groups (for example, SO$_3$X, COOX wherein X represents a hydrogen atom, or a counter cation, and the like), cationic groups (for example, quaternary ammonium salts and the like), and nonionic groups (for example, a group having a polyoxyalkylene structure, a group having a polyhydric alcohol ester structure, and the like). However, anionic groups are preferred and of them, groups having at least one —SO$_3$X are more preferred.

m1 represents 1 or 2, while m$_2$ represents 1 to 3.

Listed as substituents represented by $R_5$ and $R_8$ in General Formulas (2) and (3) are, for example, an alkyl group (for example, a methyl group, an ethyl group, a trifluoromethyl group, and the like), an alkyloxy group (for example, a methoxy group, an ethoxy group, and the like), a halogen atom (for example, a fluorine atom, a chlorine atom, and the like), a nitro group, a carbamoyl group (for example, a phenylcarbamoyl group, and the like), a sulfamoyl group (for example, a phenylsulfamoyl group, and the like), an alkyloxycarbonyl group (for example, a methoxycarbonyl group, and the like), and the like. Compounds represented by General Formula (4) will now be described.

General Formula (4)

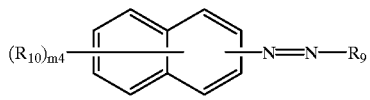

wherein $R_9$ represents a phenyl group which may have a substituent, $R_{10}$ represents a hydroxyl group, or an amino group, an acylamino group or a carbamoyl group which may have a substituent, and m4 represents 0 to 7. However, at least one substituent of $R_9$ or $R_{10}$ is a group represented by General Formula (2) or General Formula (3), or a group $R_9$ or $R_{10}$ mentioned above which is substituted by the group represented by the General Formula (2) or (3).

In General Formula (4), $R_9$ represents a phenyl group which may have a substituent. Listed as substituents, which said phenyl group may have, are, for example, an alkyl group (for example, a methyl group, an ethyl group, a trifluoromethyl group, and the like), an alkyloxy group (for example, a methoxy group, an ethoxy group, and the like), a halogen atom (for example, a fluorine atom, a chlorine atom, and the like), a nitro group, a carbamoyl group (for example, a phenylcarbamoyl group, and the like), a sulfamoyl group (for example, a phenylsulfamoyl group, and the like), an alkyloxycarbonyl group (for example, a methoxycarbonyl group, and the like), and the like.

In the amino group, the acylamino group, and the carbamoyl group, which may have a substituent represented by RIO, listed as substituents which may have an amino group, an acylamino group, and a carbamoyl group are, for example, an alkyl group (for example, a methyl group, a n ethyl group, a trifluoromethyl group, and the like), an aryl group (for example, a phenyl group, a benzimidazolyl group, and the like), and the like.

At least one substituent of $R_9$ or $R_{10}$ is a group represented by General Formula (2) or General Formula (3). The groups represented by said General Formula (2) or (3) are the same as those represented by General Formulas (2) and (3) which are previously described in General Formula (1).

Compounds represented by General Formula (5) will now be described.

General Formula (5)

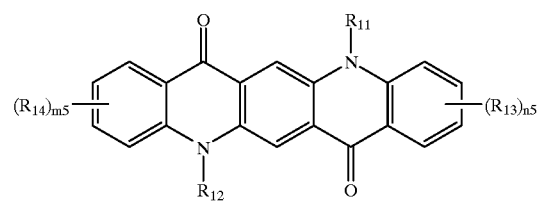

wherein $R_{11}$ and $R_{12}$ each represent a substituent having a water solubilizing group, $R_{13}$ and $R_{14}$ each represent a substituent, $n_5$ and $m_5$ each represent 0 to 4.

In General Formula (5), substituents having a water solubilizing group represented by $R_{11}$ and $R_{12}$ are the same as those having a water solubilizing group represented by $R_4$, $R_6$, and $R_7$ described in General Formula (1), and the substituents represented by General Formula (12), which were previously shown while describing General Formula (1), are preferred.

Listed as substituents represented by $R_{13}$ and $R_{14}$ are, for example, a halogen atom (for example, a chlorine atom, and the like), an alkyl group (for example, a methyl group, an ethyl group, a pentyl group, and the like), and an alkoxy group (such as a methoxy group, an ethoxy group, a hexyloxy group, and the like).

Compounds represented by General Formula (6) will be described below.

General Formula (6)

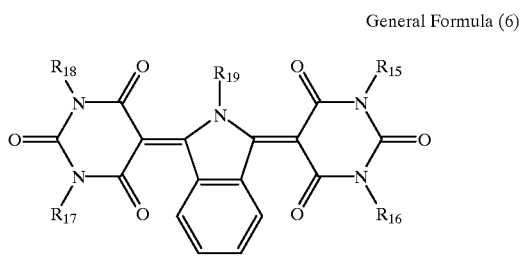

wherein $R_{15}$, $R_{16}$, $R_{17}$, $R_{18}$, and $R_{19}$ each represent a hydrogen atom or a substituent having a water solubilizing group. However, at least two of $R_{15}$, $R_{16}$, $R_{17}$, $R_{18}$, and $R_{19}$ represent a substituent having a water solubilizing group.

In General Formula (6), the substituents having a water solubilizing group represented by $R_{15}$, $R_{16}$, $R_{17}$, $R_{18}$, and $R_{19}$ are the same as those having a water solubilizing group represented by $R_4$, $R_6$, and $R_7$, and are preferably those represented by General Formula (12), which was previously described in General Formula (1).

The compounds represented by General Formula (7) will be described.

General Formula (7)

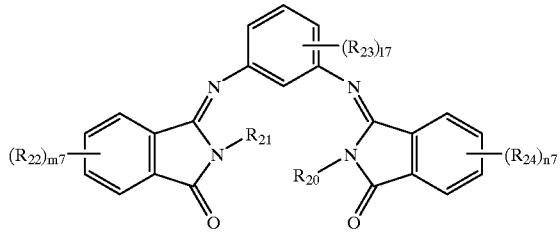

wherein $R_{20}$ and $R_{21}$ each represent a substituent having a water solubilizing group, $R_{22}$, $R_{23}$, and $R_{24}$ each represent a substituent, and $m_7$, $_{17}$, and $n_7$ each represent 0 to 4.

In General Formula (7), the substituents having a water solubilizing group represented by $R_{20}$ and $R_{21}$ are the same as those having a water solubilizing group represented by $R_4$, $R_6$, and $R_7$, and are preferably those represented by General Formula (12), which was previously described in General Formula (1).

Listed as substituents represented by $R_{22}$, $R_{23}$, and $R_{24}$ are an alkyl group (for example, a methyl group, an ethyl group, and the like), a halogen atom (for example, chlorine atom and the like), and the like.

Next, the compounds represented by General Formula (8) will be described.

General formula (8)

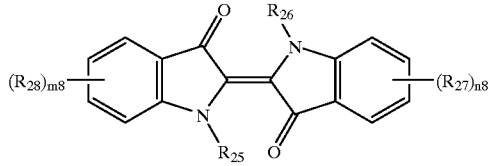

wherein $R_{25}$ and $R_{26}$ each represent a substituent having a water solubilizing group, $R_{27}$ and $R_{28}$ each represent a substituent, and $n_8$ and $m_8$ each represent 0 to 4.

In General Formula (8), the substituents having a water solubilizing group represented by $R_{25}$ and $R_{26}$ are the same as those having a water solubilizing group represented by $R_4$, $R_6$, and $R_7$, and preferably are those represented by General Formula (12), which was previously described in General Formula (1).

Listed as substituents represented by $R_{27}$ and $R_{28}$ are an alkyloxy group (for example, a methoxy group, an ethoxy group, and the like), a halogen atom (for example, chlorine atom and the like), and the like.

The compounds represented by General Formula (9) will be described next.

General Formula (9)

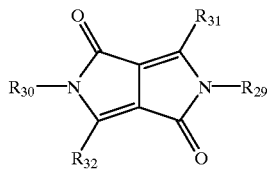

wherein $R_{29}$ and $R_{30}$ each represent a substituent having a water solubilizing group, and $R_{31}$ and $R_{32}$ each represent a hydrogen atom or a substituent.

In General Formula (9), the substituents having a water solubilizing group represented by $R_{29}$ and $R_{30}$ are the same as those having a water solubilizing group represented by $R_4$, $R_6$, and $R_7$, and preferably are those represented by General Formula (12), which was previously described in General Formula (1).

Substituents represented by $R_{31}$ and $R_{32}$ preferably are phenyl groups which may have a substituent. The substituent for the phenyl group include, for example, a halogen atom (for example, a chlorine atom and the like), an alkyl group (for example, a methyl group, an ethyl group, and the like), an alkoxy group (for example, a methoxy group, an ethoxy group, and the like), and an amino group (for example, a dimethylamino group, and the like).

Next, the compounds represented by General Formula (10) will be described.

General Formula (10)

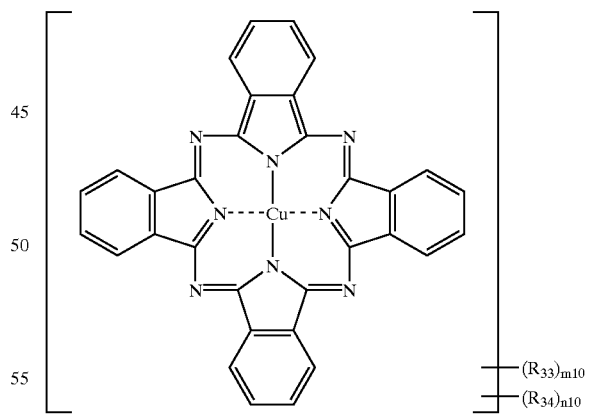

wherein $R_{33}$ represents a substituent having a water solubilizing group, $R_{34}$ represents a substituent, and $m_{10}$ represents 0 to 8, while $n_{10}$ represents 0 to 8.

In General Formula (10), the substituents having a water solubilizing group represented by $R_{33}$ are the same as those having a water solubilizing group represented by $R_4$, $R_6$, and $R_7$, which were previously described in General Formula (1) and preferably are those represented by General Formula (12), which also were previously described in General Formula (1).

Listed as substituents represented by $R_{34}$ are a halogen atom (for example, a chlorine atom and the like), an alkyl group (for example, a methyl group, an ethyl group, a pentyl group, and the like), and an alkoxy group (for example, a methoxy group, an ethoxy group, a hexyloxy group, and the like). Those represented by the General Formula (11) are most preferable in the present invention.

Next, the compounds represented by General Formula (11) will be described.

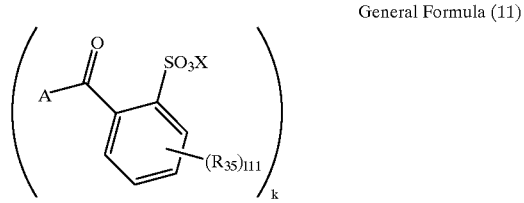

General Formula (11)

In General Formula (11), "A" represents an insoluble pigment residual group, and the group in the parenthesis bonds to the nitrogen atom of "A". X represents a hydrogen atom or a counter cation, $R_{35}$ represents a substituent, and $l_{11}$ represents 0 to 4. Further, when $l_{11}$, is 2 to 4, a plurality of $R_{35}$ may be joined together to form a ring, while "k" represents 1 to 5.

In General Formula (11), listed as insoluble pigment residual groups are, for example, residual groups of azo pigments, azomethine pigments, methine pigments, diphenylmethane pigments, triphenylmethane pigments, quinacridone pigments, anthraquinone pigments, perylene pigments, indigo pigments, quinophthalone pigments, isoindolinone pigments, isoindoline pigments, azine pigments, oxazine pigments, thiazine pigments, dioxazine pigments, thiazole pigments, phthalocyanine pigments, diketopyrrolopyrrole pigments, and the like.

These pigments may have substituents which include halogen atoms (for example, chlorine atom and the like), alkyl groups (for example, a methyl group, an ethyl group, a pentyl group, and the like), aryl groups (for example, a phenyl group), heterocyclic ring groups (for example, a pyridyl group, furyl group, thienyl group, and the like), alkoxy groups (for example, a methoxy group, an ethoxy group, a hexyloxy group, and the like), amino group (for example, a dimethylamino group and the like), acylamino groups (for example, an acetylamino group, a propanoylamino group, a benzoylamino group, and the like), sulfonylamino groups (for example, a methanesulfonamido group, benzenesulfonamido group, and the like), and the like.

Insoluble pigments preferred in the present invention include acetanilide azo pigments, isoindoline pigments, isoindolinone pigments, quinacridone pigments, naphthol azo pigments, pyrrolopyrrole pigments, indigo pigments, and phthalocyanine pigments.

Listed as specific examples of counter cations represented by X are metal ions such as lithium ions, sodium ions, potassium ions, and the like.

Listed as specific examples of substituents represented by $R_{35}$ are a halogen atom (for example, a chlorine atom, a bromine atom, an iodine atom, and the like), a nitro group, an alkoxy group (for example, a methoxy group, an ethoxy group, an isopropyloxy group, and the like), a $SO_3X$ group (wherein X represents a hydrogen atom or a counter cation;

listed as specific example of counter cations are metal ions such as a lithium ion, a sodium ion, a potassium ion, and the like, and an ammonium ion).

Specific examples of compounds, which can be converted to insoluble pigments of the present invention, are illustrated below.

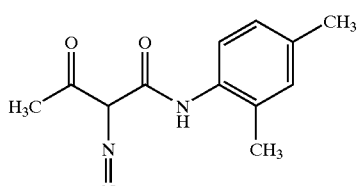

1

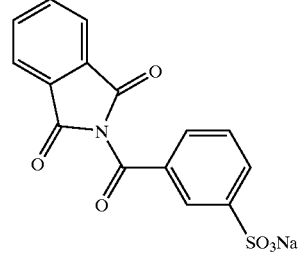

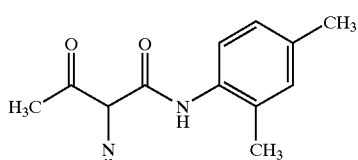

2

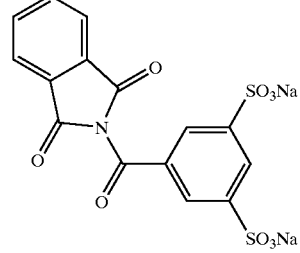

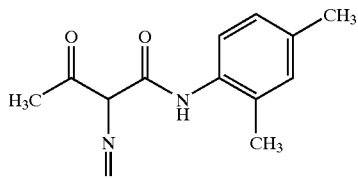

3

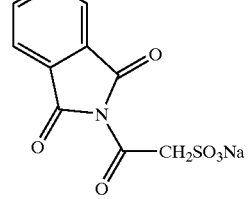

4
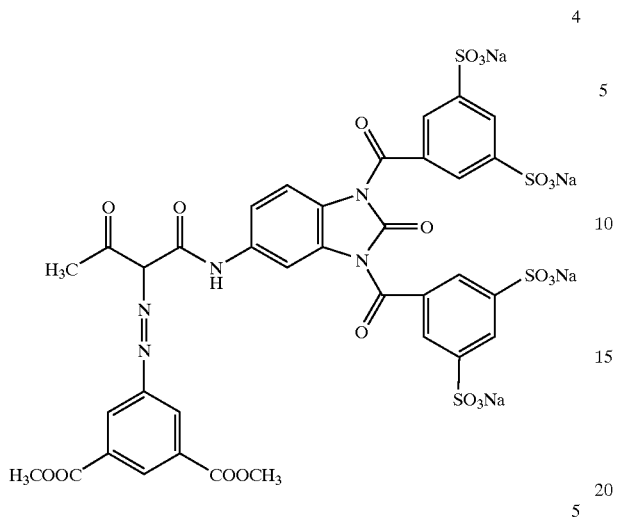
5
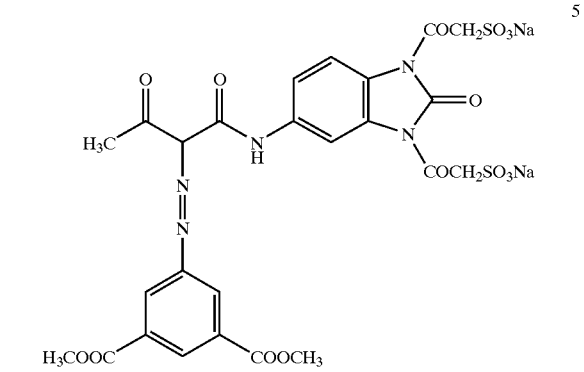
6
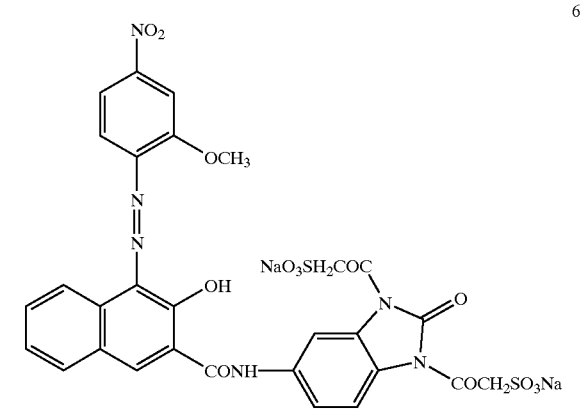
7
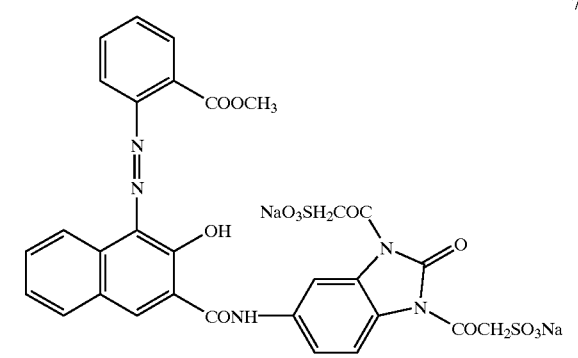
8
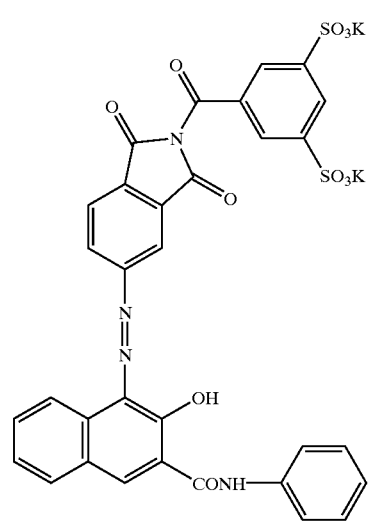
9
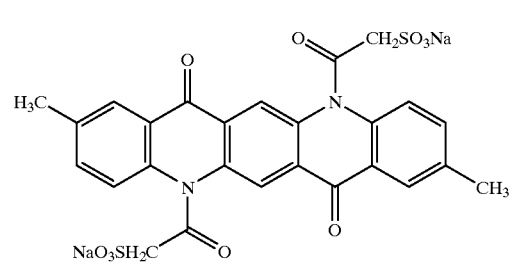
10
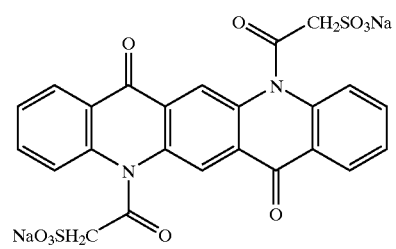
11
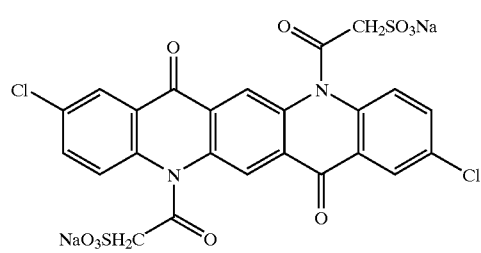
12
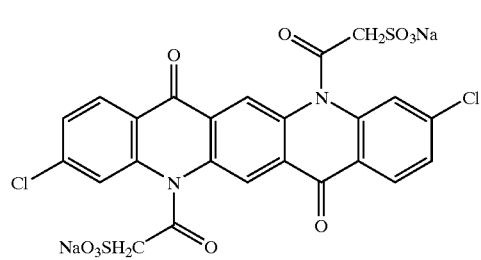

13
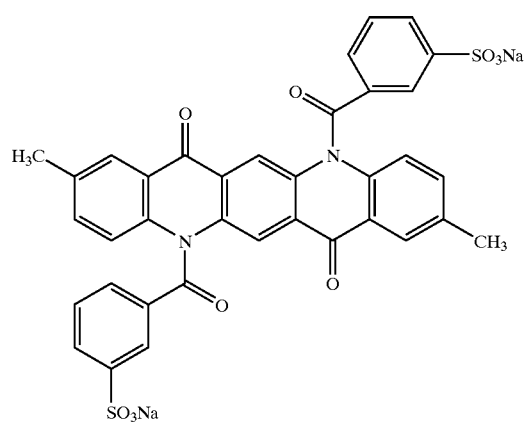
14
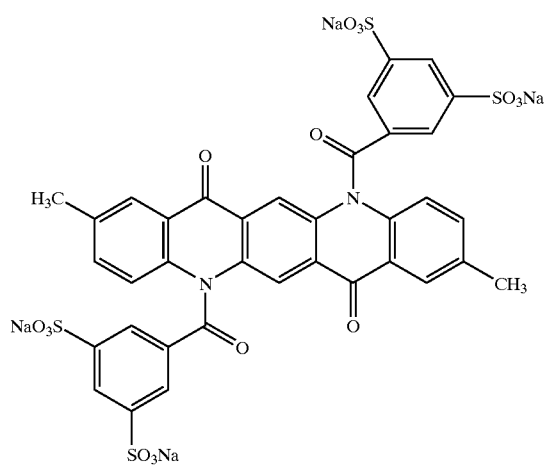
15
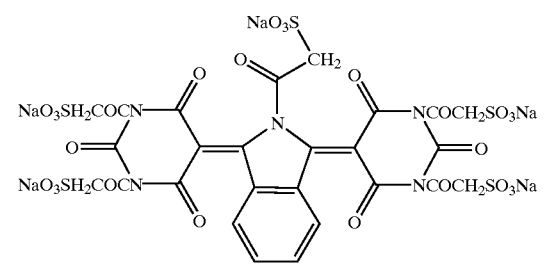
16
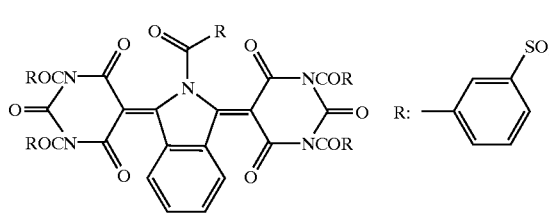
17
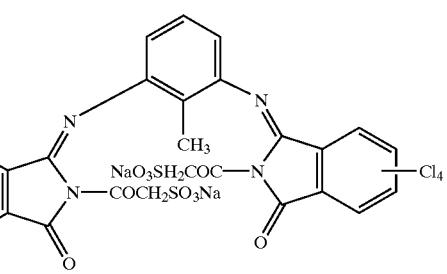
18
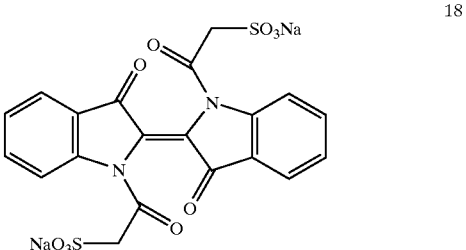
19
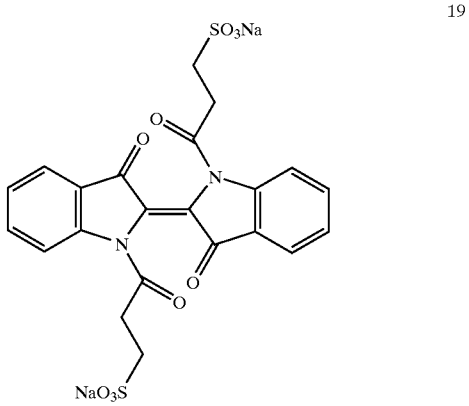
20
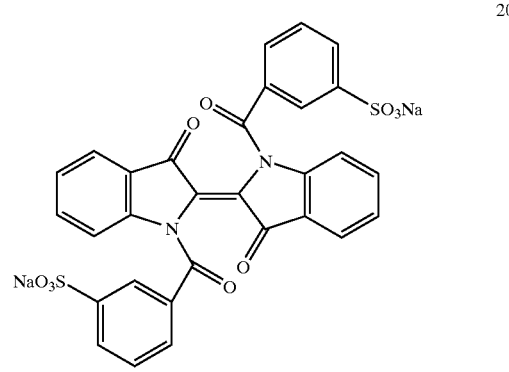
21
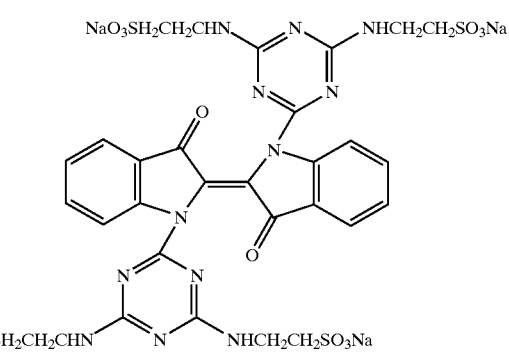

-continued
22
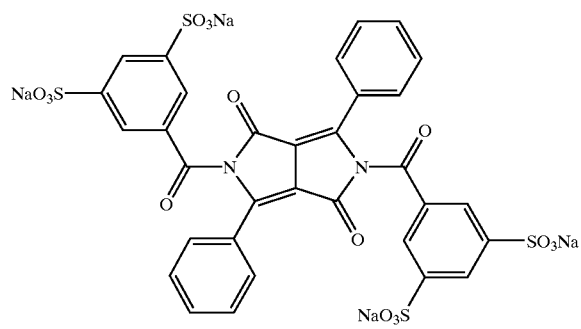
23
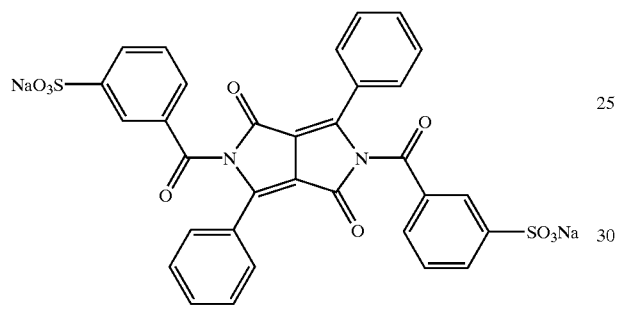
24
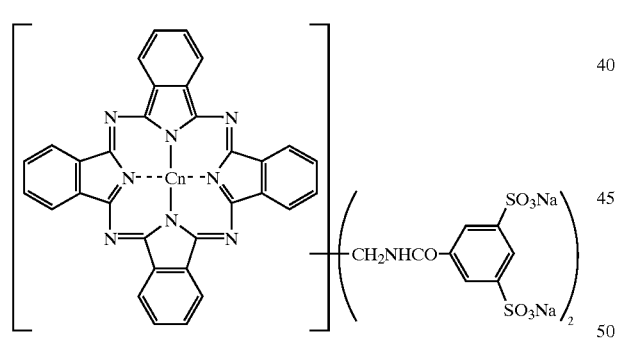
-continued
26
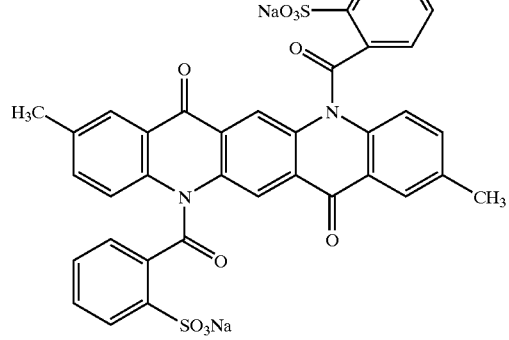
27
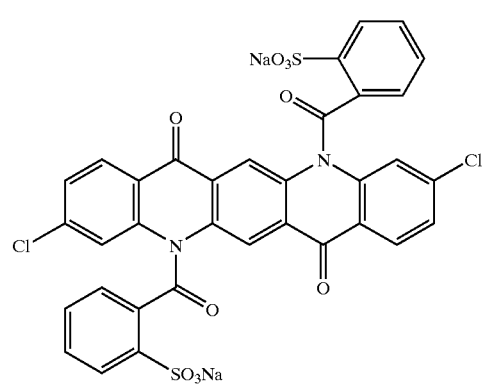
28
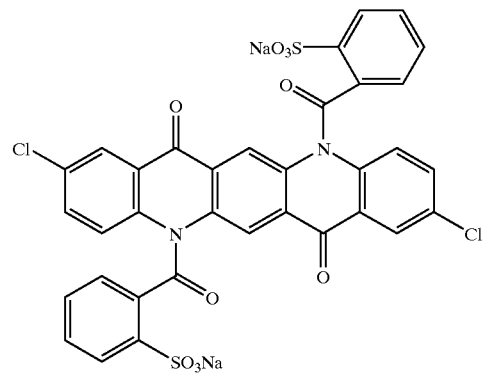
25
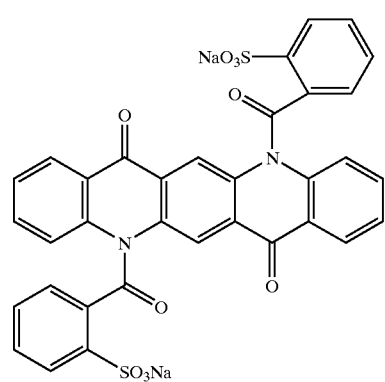
29
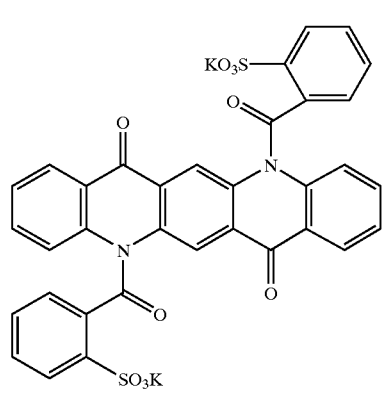

30
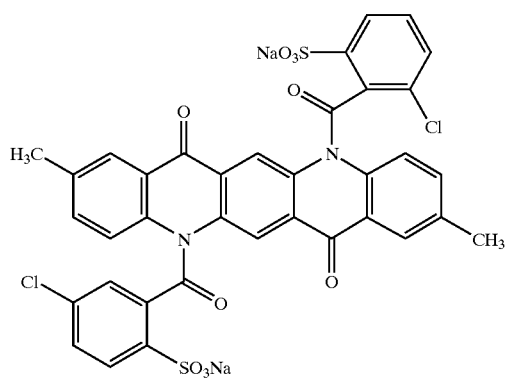
31
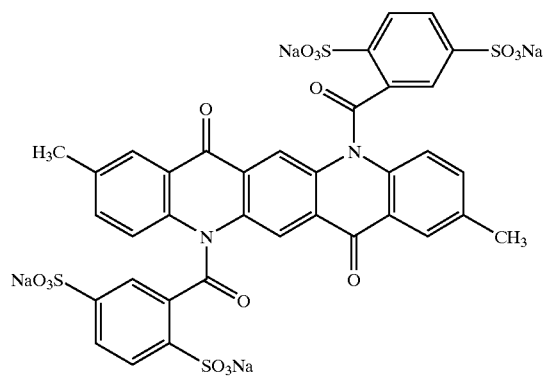
32
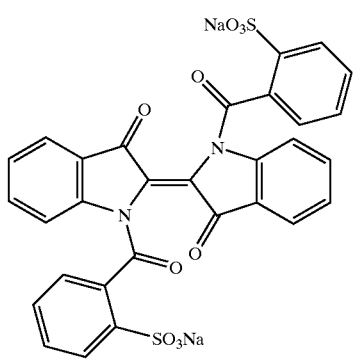
33
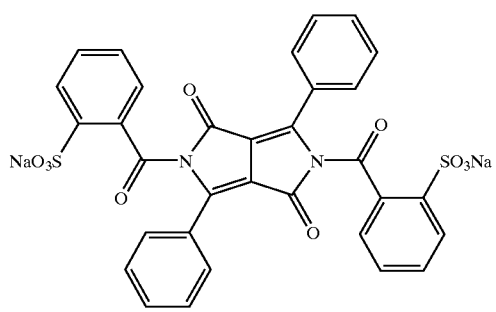
34
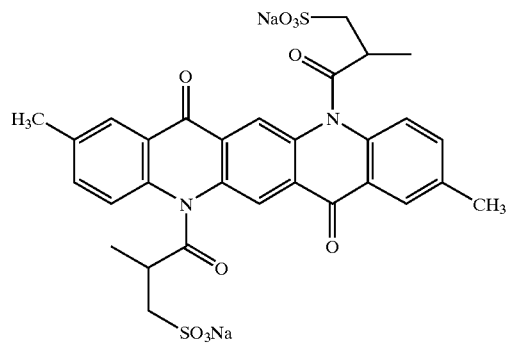
35
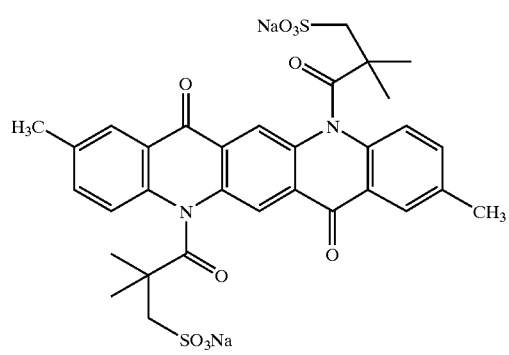
36
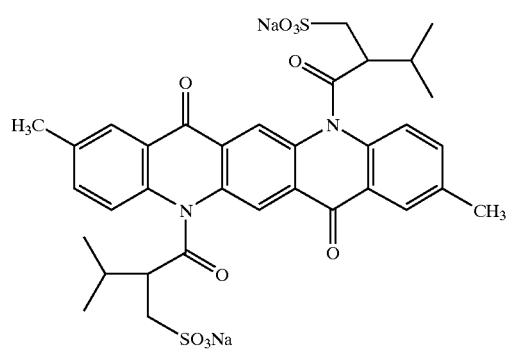
37
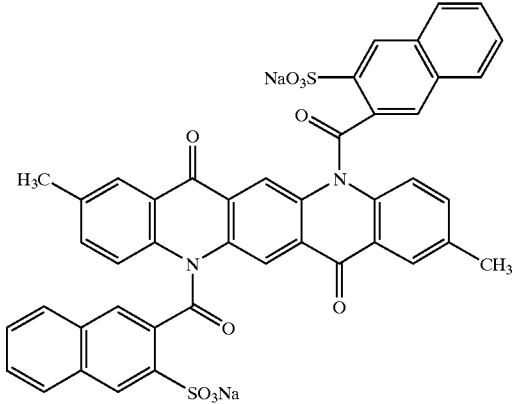

The precursors of the present invention can be synthesized by modifying the corresponding insoluble pigments, employing methods known in the art.

Listed as methods known in the art, which modify said insoluble pigments, are, for example, acylation using acid chlorides or acid anhydrides, oxycarbonylation using chloroformic acid esters or O(COOR)$_2$ (wherein R represents an alkyl group, a phenyl group, and the like), sulfonylation using sulfonyl chloride, and the like.

Synthesis examples of the precursors of the present invention will now be described.

Synthesis Example 1
Synthesis of Exemplified Compound 20

Dispersed into 150 ml of N,N-dimethylformamide were 26 g of indigo and 27 g of 2,6-lutidine, and 46 g of m-sulfobenzoyl chloride were then added to the resultant dispersion over one hour. After said addition, the resultant mixture underwent reaction at an internal temperature of 80° C. for 10 hours.

The reaction mixture was cooled to room temperature and an aqueous solution containing 42 g of barium chloride was added. The solid deposit was collected by filtration. The resultant solid was dissolved in 400 ml of warm water, and impurities were removed by heated filtration. Added to the obtained solution was an aqueous solution containing 35 g of potassium sulfate, and the resultant mixture was stirred. The resultant deposit was removed by filtration and the filtrate was concentrated under reduced pressure. The resultant residue was recrystallized in pure water, and 16 g of the target compound was obtained.

The obtained compound was identified as the target compound, employing NMR as well as mass spectra.

Synthesis Example 2
Synthesis of Exemplified Compound 26

A mixture consisting of 13.6 g of dimethylquinacridone (Pig. Red 122), which had been washed with heated acetone and subsequently dried, 400 ml of dried N-methyl-2-pyrrolidone, 6.4 g of sodium hydride, and 100 ml of hexamethylene phosphorictriamide (HMPA) was stirred at 80° C. for 30 minutes. After cooling to 60° C., 9.2 g of o-sulfobenzoic anhydride were added, and the resultant mixture was heated and stirred at 80° C. for 2 hours. After cooling to 60° C., 9.2 g of o-sulfobenzoic anhydride were added, and the resultant mixture was heated and stirred at 80° C. for 8 hours. The mixture was cooled to room temperature, and 2 liters of n-hexane were added and stirred. Then, the resultant mixture was left untouched. The upper layer of the resultant two layers was removed by decantation. Said operation was repeated twice and a yellowish brown solid was obtained. The resultant solid was blended with iced water and stirred. After adjusting the pH to 9 using hydrochloric acid, 20 g of sodium chloride were added to the resultant mixture. The resultant mixture was heated to 60° C., then cooled over night and left untouched. A small amount of deposit solid was removed by filtration, and 40 g of sodium chloride were further added to the filtrate and the resultant mixture was heated to 60° C., cooled over night and left untouched. Then the target compound was obtained by collecting the solid deposit employing filtration. The yield after drying was 8.5 g.

The obtained compound was identified as the target compound employing NMR as well as mass spectra.

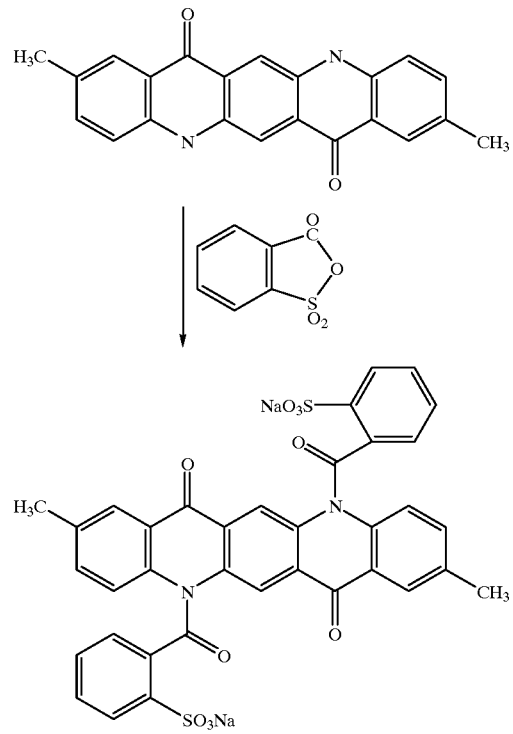

The water based composition of the present invention is obtained by dissolving the precursors of the present invention in a water based solvent.

The water based solvents, as described in the present invention, refers to solvents prepared by blending water with water-soluble organic solvents. These solvents may be blended with a small amount of other solvents.

Listed as water soluble organic solvents employed in the present invention are, for example, alcohols (for instance, methanol, ethanol, propanol, isopropanol, butanol, isobutanol, secondary butanol, tertiary butanol, pentanol, hexanol, cyclohexanol, benzyl alcohol, and the like), polyhydric alcohols (for instance, ethylene glycol, diethylene glycol, trimethylene glycol, polyethylene glycol, propylene glycol, dipropylene glycol, polypropylene glycol, butylenes glycol, hexanediol, pentanediol, glycerin, hexanetriol, thiodiglycol, and the like), polyhydric alcohol ethers (for instance, ethylene glycol monomethyl ether, ethylene glycol monoethyl ether, ethylene glycol monobutyl ether, diethylene glycol monomethyl ether, diethylene glycol monomethyl ether, diethylene glycol monobutyl ether, propylene glycol monomethyl ether, propylene glycol monobutyl ether, ethylene glycol monomethyl ether acetate, trimethylene glycol monomethyl ether, trimethylene glycol monoethyl ether, trimethylene glycol monobutyl ether, ethylene glycol monophenyl ether, propylene glycol monophenyl ether, and the like), amines (for example, ethanolamine, diethanolamine, triethanolamine, N-methyldiethanolamine, N-ethyldiethanolamine, morpholine, N-ethyl morpholine, ethylenediamine, diethylenediamine, triethylenetetramine, tetraethylenepentamine, polyethyleneimine, pentamethyldiethylenetriamine, tetramethylpropylenediamine, and the like), amides (for example, formamide, N,N-dimethylformamide, N,N-dimethylacetoamide, and the like), heterocycles (for example, 2-pyrrolidone, N-methyl-2-pyrrolidone, cyclohexylpyrrolidone, 2-oxazolidone, 1,3 dimethyl-2- imidazolidinone, and the like), sulfoxides (for example, dimethylsulfoxide, and the like), sulfones (for example, sulfolane, and the like), acetonitrile, acetone, and the like. Said water-soluble organic solvents may be used individually or in combination. The added amount of total water-soluble organic solvents in ink is preferably between 5 and 60 percent by weight.

The precursor is dissolved in water-based solvent. In other words, there is no insoluble material substantially. The soluble precursor is different from an ink dispersion in which the precursor is dispersed stably with assist of surfactant, if it is necessary. It is also different from a dispersion in which precursor dissolved in non-water-solvent is dispersed in the water-based solvent, if it is necessary. The dissolved state means the similar state as water based dye ink for ink-jet printing which is obtained by dissolving acidic dye or direct dye in water based solvent homogeneously. Measurement of laser photon correlation method may be employed to determine whether it is dissolved or not. When an ink, in which the precursor is dissolved in the water based solvent of the invention, is measured, particle distribution diameter is not observed essentially. To the contrary particle having average diameter of several tens nanometer to several tens micrometer are observed in the above mentioned dispersion ink or ordinary pigment based ink. Observation of sediment residue by super centrifugal separator is another measure to determine whether it is dissolved or not. The sediment residue is not observed in an ink in which the precursor is dissolved in the water based solvent. To the contrary sediment residue is observed in the above mentioned dispersion ink or ordinary pigment based ink.

In order to meet requirements for improving various performances such as ejection stabilizing properties, adaptability to print heads as well as ink cartridges, storage stability, image retention quality, and the like, if desired, added to the ink composition of the present invention may be viscosity control agents, surface tension control agents, specific resistance control agents, film forming agents, dispersing agents, surface active agents, UV absorbers, antioxidants, fade resistant agents, antiseptic agents, rust preventives, and the like.

The viscosity of the ink composition of the present invention during its flying is preferably no more than 40 cps, is more preferably no more than 30 cps, and is most preferably between 2 and 12 cps.

The surface tension of the ink composition of the present invention during its flying is preferably at least 20 mN/m, and is more preferably between 40 and 60 mN/m.

In the ink compositions of the present invention, the content of precursors of the present invention is preferably between 0.5 and 10 weight percent based on the total weight of the ink composition.

The image forming method of the present invention will now be described.

Preferred as methods for printing with the water based ink compositions of the present invention is an ink jet print system.

The ink jet print system employed in the present invention is not particularly limited, and either a continuous system or an on-demand system may be employed. On-demand type systems include electric-mechanical conversion systems (for example, a single cavity type, a double cavity type, a vender type, a piston type, a share mode type, a shared wall type, and the like), electric-thermal conversion systems (for example, a thermal ink jet type, a bubble ink jet type, and the like), and the like.

Employed as print media may be either so-called plain paper or special paper (coated paper or glossy paper).

On the print media, the precursors of the present invention are converted to insoluble pigments, by any of a chemical means, a thermal means, a photodecomposition means, and a radiation means, or a means of a combination of these, which are capable of converting said precursors of the present invention to insoluble pigments.

The chemical means, as described above, implies that compounds (hereinafter occasionally referred to as pigment formation promoting compounds), which initiate the conversion of the precursor to the insoluble pigment or promote said conversion, are placed together with said precursors on the print medium, while employing any appropriate method.

Listed as methods to allow said compounds to be placed together with the precursors on the print medium are a method in which special print media, into which said pigment formation promoting compounds are previously incorporated, are employed, a method in which pigment formation promoting compounds are supplied onto the medium before or after printing, and the like.

Methods in which pigment formation promoting compounds are supplied onto the print medium before or after printing include, for example:
1) a method in which a pigment formation promoting compound solution is supplied from the head of an ink jet printer so as to superimpose the image,
2) a method in which a pigment formation promoting compound solution is uniformly applied onto a print medium, employing a coating means,
3) a method in which a bath, containing a pigment formation promoting compound solution, is prepared and a print medium is dipped in it,
4) a method in which a pigment formation promoting compound solution is absorbed by a sponge-like medium, which is brought into contact with a print medium,
5) a method in which a pigment formation promoting compound solution is sprayed onto the print medium employing a sprayer, and the like.

Listed as pigment formation promoting compounds are acids, bases, nucleophilic agents, electrophilic agents, oxidizing agents, reducing agents, coordination compounds, and the like. Of these, acids or bases are preferred, and acids are specifically preferred.

Further, pigment formation promoting compounds are preferably water-soluble compounds, and are more preferably supplied onto a print medium in the form of the solution in which water is employed as the main component.

Listed as acids employed as pigment formation promoting compounds may be either organic acids or inorganic acids. Listed as organic acids are, for example, acetic acid, propionic acid, lauric acid, acrylic acid, ascorbic acid, benzoic acid, salicylic acid, lactic acid, oxalic acid, and the like;, while listed as inorganic acids are, for example, hydrochloric acid, nitric acid, sulfuric acid, phosphoric acid, boric acid, and the like. Employed as bases may be either organic bases or inorganic bases. Listed as organic bases are, for example, pyridine, triethylamine, aminoethanol, triethanolamine, dimethylaniline, and lutidine, while as listed as inorganic bases are, for example, potassium carbonate, sodium carbonate, sodium bicarbonate, potassium bicarbonate, sodium hydroxide, potassium hydroxide, sodium acetate, and the like.

In the chemical means of the resent invention, employing a method in which precursors are converted to insoluble pigments, employing acids or bases, said conversion is preferably carried out by generating bases on the recording medium. With respect to the methods described below, included are:

a) a method in which after ink jet printing, an aqueous acid or base solution is individually supplied onto a recording medium
b) a method in which an aqueous acid or base solution is individually supplied by injection from a head installed in an ink jet printer
c) a method in which recording is carried out after a base has been incorporated in to a recording medium.

"a)" exhibits advantages, in which in order to supply acids or bases, an aqueous solution is supplied onto a recording medium in addition to the recording ink, and as a result, the supply amount does not exceed the absorbable amount of said recording medium so that no bleeding results, and the printer cost is lowered due to a decrease in the device load; "b)" exhibits advantages in which the supply channel is not eroded by acids or bases during use over extended period of time; and "c)" exhibits advantages in which during storage, the base is neutralized by carbonic acid gas in ambient air and as a result, regeneration of pigments after storage is not affected.

A process in which acids are generated on a recording medium will be described. Processes for generating acids on the recording medium include, for example, a method in which acids are generated in response to monochromatic light or thermal stimulus, or a method in which a plurality of components undergo chemical reaction to generate acids.

Widely employed a s a method, in which acids are generated in response to monochromatic light or thermal stimulus, may be acid-generating compounds which are employed in the field of photosensitive resins. Listed as examples of acid-generating compounds which may preferably be employed are diazonium salts, iodonium salts, sulfonium salts, phosphonium salts, sulfonic acid esters, sulfonic acid chlorides, sulfamic acid salts, organic halides, and the like. Further, listed as specific examples of those compounds are those disclosed in Japanese Patent Publication Nos. 62-44258, 59-1281, 3-4898, and 2-39783; and Japanese Patent Publication Open to Public Inspection Nos. 54-74728, 53-36223, 59-148784, 7-20629, 7-271029; as well as others.

Methods, in which a plurality of components undergoes chemical reaction, include, for example, a method in which acids are generated through complex forming reaction. The method in which acids are generated through said complex forming reaction is preferable as the process for generating acids on the recording medium of the present invention.

Said complex forming reaction takes place utilizing a plurality of components, for example, component $X_1$ and $Y_1$, as shown below.

Component $X_1$ is a compound which forms a stable complex together with the metal ions of component $Y_1$, and preferably includes water-soluble multidentate ligands. Further, preferably, component $X_1$ is a neutral or weakly acidic compound. Component $Y_1$ is a salt consisting of a metal ion capable of forming a complex, and an acidic ion. Metal ions employed herein are preferably transition metal ions, and are more preferably metal ions having an atomic number of 21 through 30. They are more preferably ions of manganese, iron, cobalt, nickel, copper, zinc, and the most preferable metal is zinc. Cited as acidic ions are, for example, a sulfuric acid ion, a hydrochloric acid ion, a phosphoric acid ion, and the like. The salts of component $Y_1$ are preferably water-soluble.

When component $X_1$ and component $Y_1$ are mixed, for example, in water, acids are generated and the pH decreases. This mechanism is understood to function in such a manner that a ligand forming compound of component $X_1$ coordinates with the metal ion of $Y_1$ to form a stable complex and the pH decreases due to the resulting acidic component.

A preferable acid generating method is one in which a plurality of components undergo chemical reaction to generate acids. At that time, a plurality of said components are individually added to the ink as well as to the recording medium.

The embodiment oft he preferable acid generating method of the present invention is one in which an acid is generated through the complex forming reaction between the component of the ink composition and the component of the recording medium.

Specific examples, utilizing the complex forming reaction, which are particularly preferred, are the method in which acids are formed by mixing any compound in Group $X_1$ and any compound in Group $Y_1$.

Examples of Group $X_1$ are illustrated.

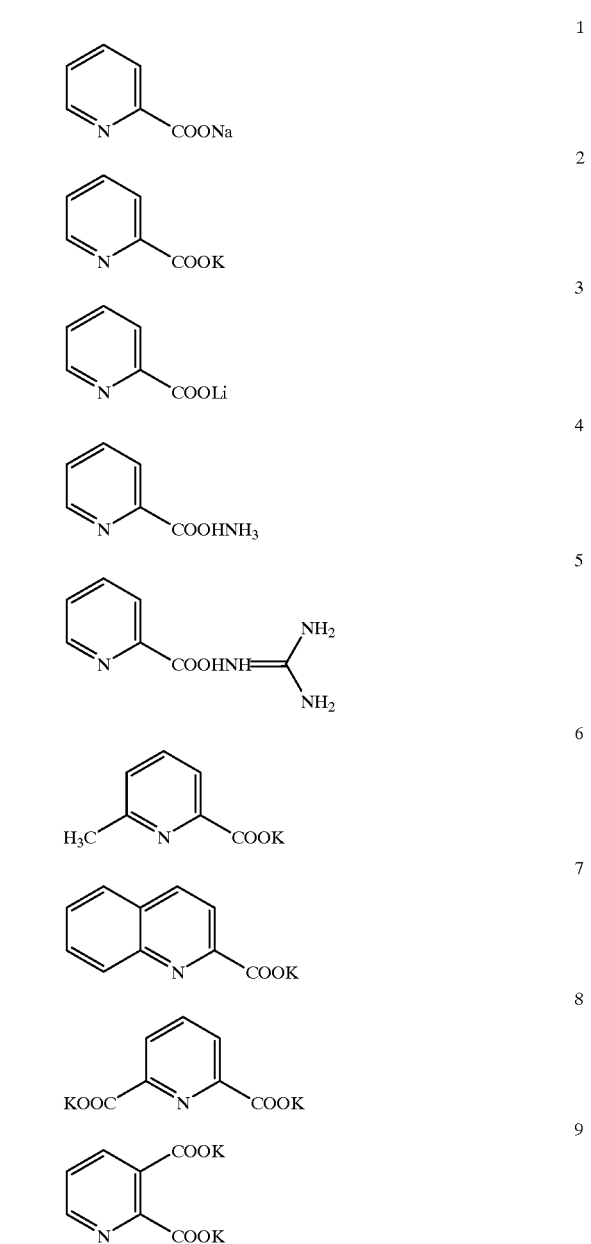

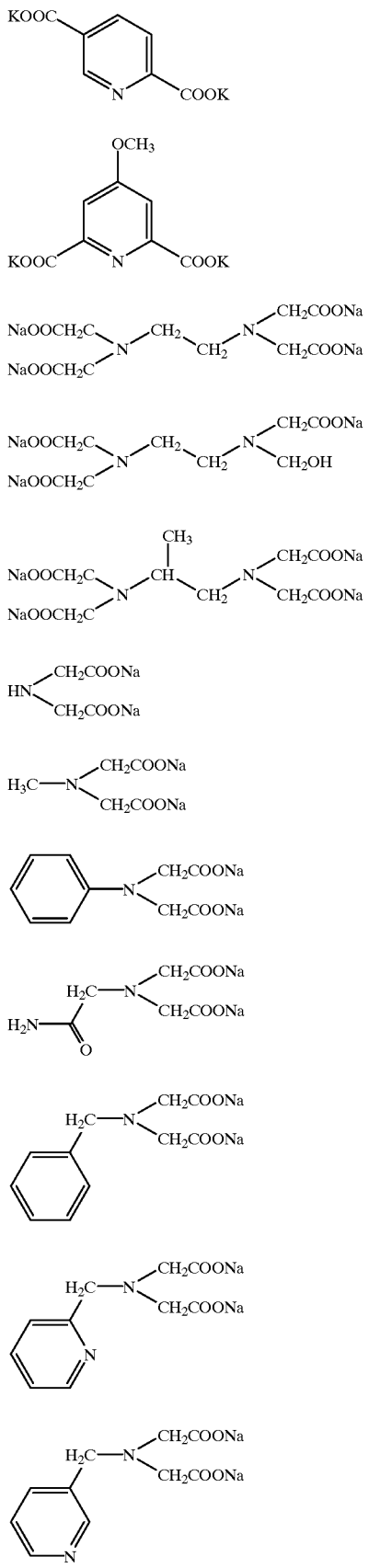

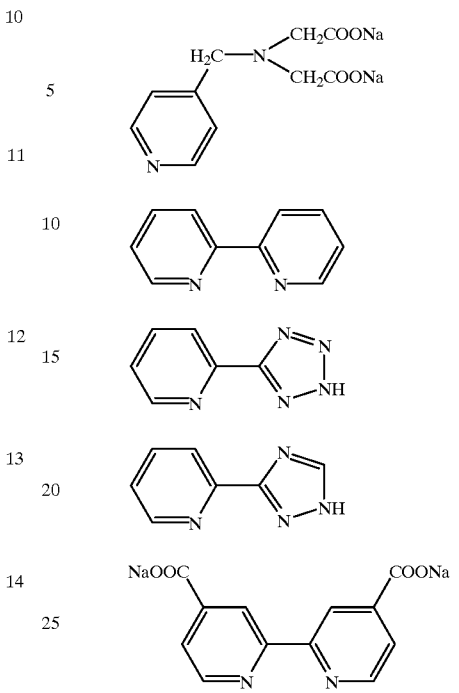

Group $Y_1$: zinc sulfate, copper sulfate, cobalt sulfate, nickel sulfate, manganese sulfate. These may be hydrated. Of these, zinc sulfate is preferred.

The specifically preferable acid generation method is one in which acids are generated on the recording medium by carrying out recording on said recording medium comprising at least one compound in said $Y_1$ Group, employing the ink comprising at least one compound in said $X_1$ Group. After recording, heating is more preferably carried out.

Herein described is an acid generation method utilizing the complex forming reaction as well as an image forming method having a process in which acids are formed utilizing said complex forming reaction. Said image forming method having a process, in which acids are formed utilizing said complex forming reaction, is useful for an image forming method in which other ink compositions, comprising no precursors which can be converted to an insoluble pigment. Said image forming method having a process in which an acid is formed, utilizing said complex forming reaction, is useful for image formation, utilizing ink jet recording employing ink compositions containing selected colorants, for example, from acid dyes, direct dyes, reactive dyes, disperse dyes, and pigments, and is effective for minimization of color bleeding, increase in water resistance of images, minimization of bleeding, and the like. Specifically, said effects are pronounced when images are formed employing a water based ink comprising colorants selected from acid dyes, direct dyes, reactive dyes, and pigments in an amount of at least 50 percent water.

After image formation, some or all acids generated by the complex forming reaction are preferably removed by water washing. Said acids may be removed by washing the formed images with either water or weakly alkaline water.

Cited as base generating processes on a recording medium are, for example those utilizing a method in which a base is generated employing either decomposition or self reaction of any of single component compounds and a method in which a plurality of components undergo chemical reaction whereby a base is generated.

Listed as said base generating methods are those employing salts formed between organic acids which are subjected to thermal decarboxylation and bases, compounds which release amines through intramolecular nucleophilic displacement reaction, Lossen rearrangement, Beckmann rearrangement, and the like. Such specific examples are described in U.S. Pat. Nos. 4,511,493, and 4,657,848; Japanese Patent Publication Open to Public Inspection Nos. 50-22625, 61-251840, 61-219950, 61-55646, 61-55645, 61-55644, 61-53639, 61-32844, and 62-65038; and others. The specifically preferable base generating method is one employing a complex forming reaction. Such specific examples are described in Japanese Patent Publication Open to Public Inspection Nos. 62-187847 and 12-85236.

The preferable base generating method is one in which a plurality of components undergo chemical reaction, thereby forming a base. At that time, a plurality of components are preferably incorporated individually into the ink as well as the recording medium.

The embodiment of the preferable base generating method of the present invention is one in which bases are generated through complex forming a reaction between the component of the ink composition and the component in the recording medium.

Specific examples, which are particularly preferable as the base generating method, utilizing the complex forming reaction, are methods in which any compound in Group $X_2$ and any compound in Group $Y_2$ described below are mixed, thereby generating bases.

Group $X_2$:

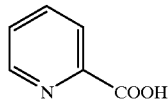
A1

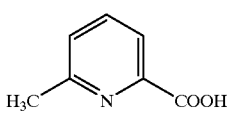
A2

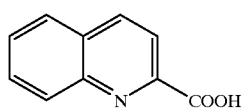
A3

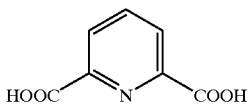
A4

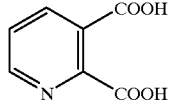
A5

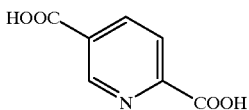
A6

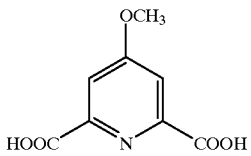
A7

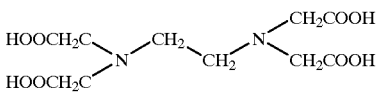
A8

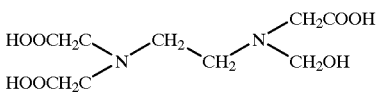
A9

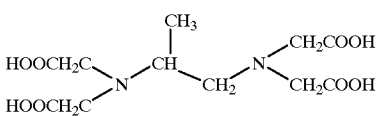
A10

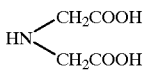
A11

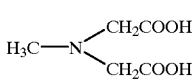
A12

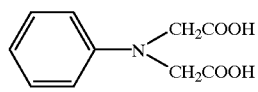
A13

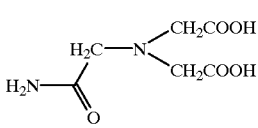
A14

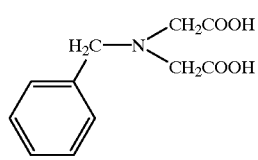
A15

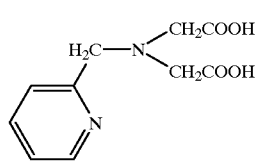
A16

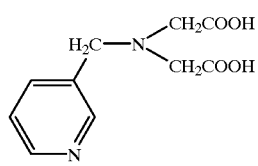
A17

A18

-continued

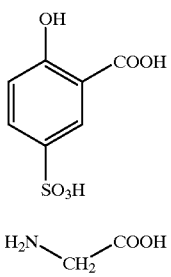

A19

A20

H₂N—CH₂—COOH

Group $Y_2$: basic zinc carbonate, calcium carbonate, basic cobalt carbonate, basic copper carbonate, basic nickel carbonate, nickel hydroxide, ZnO, $Zn(OH)_2$, $Co(OH)_2$, $Cu(OH)_2$, $Ni(OH)_2$, $Mn(CO)_3$. In Group $Y_2$, zinc oxide is preferable.

The specifically preferable base generating method is one in which base are generated on a recording medium by carrying out recording on said recording medium comprising at least one of the Group $X_2$ compounds, employing ink comprising at least one of the Group $Y_2$ compounds. After recording, it is more preferable to carry out heating.

Compounds, which are necessary for generating either bases or acids, are supplied onto a recording medium. Supplying methods include:
1) a method in which any of said compounds are previously incorporated into the recording medium
2) a method in which any of said compounds are incorporated into an ink composition and supplied onto the recording medium together with said ink
3) a method in which any of said compounds is supplied onto a recording medium through a printer, employing a liquid, other than an ink composition.

Said methods may be employed individually or in combination.

Image forming methods, utilizing acid or base generating methods include those having process (A) in which recording is carried out on a recording medium, employing an ink composition comprising precursors which can be converted to an insoluble pigment, employing either an acid or a base, and process (B) which generates either an acid or a base on the recording medium. The order of processes A) and B) is optional and both may simultaneously be carried out. Further, the image forming method of the present invention preferably include, in addition to processes (A) and (B), process (C) in which precursors, which can be converted to an insoluble pigment employing either an acid or a base, are converted to said insoluble pigment. Still further, the image forming method of the present invention preferably include, in addition to processes (A), (B), and (C), process (D) in which said recording medium is heated. Process (D) is preferably included to promote said processes (B) and (C). However, a preferable embodiment is such that process (D) is simultaneously carried out with process (A), or is carried out immediately after process (A).

Further, the process for heating recording media may be carried out so that it is divided into several portions which are regulated at the same or different temperatures. The heating temperature is preferably in the range of 50 to 230° C., and is more preferably in the range of 80 to 190° C. The heating time is preferably in the range of 0.5 to 60 seconds. During heating, pressure in the range of 0.5 to 45 Kgf/cm² is preferably applied. Cited as heating means are heated rollers (for example, electrophotographic heated fixing rollers), warm forced air, infrared heaters, and the like.

The thermal means, which converts the precursors of the present invention to insoluble pigments, as described herein, means that printed materials are heated after printing.

The heating temperature is preferably in the range of 50 to 230° C., and is more preferably in the range of 70 to 190° C. Listed as heating means are heated rollers (for example, heated fixing rollers such as used for electrophotography), heated forced air, infrared heaters and the like.

The photodecomposition means which converts the precursors of the present invention to insoluble pigments, as described herein, means that printed materials are subjected to irradiation of ultraviolet rays, visible light, infrared rays, and the like, after printing.

The Preferred embodiment, in which the precursors of the present invention are converted to insoluble pigments, is a method, in which either before or after printing, either an acidic or a basic solution is supplied to a print medium and heated.

EXAMPLES

Example 1

Preparation of Ink

Preparation of Present Invention Ink Samples 1 through 27 and Comparative Dye Ink Sample 29

Each ink was prepared in such a manner that colorants, shown in Tables 1 and 2 in an amount, shown in Tables 1 and 2 and solvents shown in Tables 1 and 2 in an amount shown in Tables 1 and 2, were employed so that the total volume was adjusted to 100 parts by adding deionized water. Further, additives shown in Tables 1 and 2 were added so as to obtain a concentration of 0.1 percent.

Preparation of Comparative Pigment Ink Sample 28

A mixture consisting of 6 parts of Pigment Red (a comparative pigment), 6 parts of Olefin STG (Shin-Etsu Kagaku), and 8 parts of deionized water was dispersed for 8 hours employing a sand mill (in which 0.3 mm zirconia beads were employed).

Added to the resultant dispersion were 20 parts of diethylene glycol, and ink was then prepared by adjusting the total volume to 100 parts by adding deionized water.

TABLE 1

| | Colorant | | Solvent | | Additive (added to | |
|---|---|---|---|---|---|---|
| | Type | Amount | Type | Amount | obtain 0.1%) | |
| 1 | 1 | 4 | diethylene glycol | 25 | Surfynol 465 | present invention |
| 2 | 2 | 4 | diethylene glycol | 20 | Surfynol 465 | present invention |
| 3 | 4 | 4 | diethylene glycol | 20 | Surfynol 465 | present invention |
| 4 | 7 | 3 | diethylene glycol | 20 | Surfynol 465 | present invention |
| 5 | 8 | 2 | diethylene glycol monomethyl ether | 25 | Surfynol 465 | present invention |
| 6 | 9 | 2 | diethylene glycol | 20 | DES | present invention |
| 7 | 10 | 2 | diethylene glycol | 30 | Surfynol 465 | present invention |
| 8 | 13 | 2 | diethylene glycol | 30 | Surfynol 465 | present invention |
| 9 | 14 | 2 | diethylene glycol | 30 | Surfynol 465 | present invention |

TABLE 1-continued

| | Colorant | | Solvent | | Additive (added to obtain 0.1%) | |
|---|---|---|---|---|---|---|
| | Type | Amount | Type | Amount | | |
| 10 | 15 | 5 | diethylene glycol | 15 | Surfynol 465 | present invention |
| 11 | 16 | 4 | N-methyl-2-pyrrolidone | 20 | Surfynol 465 | present invention |
| 12 | 17 | 4 | diethylene glycol | 20 | Surfynol 465 | present invention |
| 13 | 20 | 3 | glycerin | 15 | Surfynol 465 | present invention |
| 14 | 23 | 2 | diethylene glycol | 20 | Surfynol 465 | present invention |
| 15 | 24 | 2 | diethylene glycol | 20 | Surfynol 465 | present invention |
| 16 | 25 | 6 | N-methyl-2-pyrrolidone | 30 | Surfynol 465 | present invention |
| 17 | 26 | 6 | N-methyl-2-pyrrolidone | 30 | Surfynol 465 | present invention |
| 18 | 27 | 4 | N,N-dimethyl-formamide | 30 | Surfynol 465 | present invention |
| 19 | 28 | 4 | N-methyl-2-pyrrolidone | 30 | Surfynol 465 | present invention |
| 20 | 29 | 5 | N-methyl-2-pyrrolidone | 30 | Surfynol 465 | present invention |
| 21 | 30 | 3 | N-methyl-2-pyrrolidone | 25 | DES | present invention |

TABLE 2

| | Colorant | | Solvent | | Additive (added to obtain 0.1%) | |
|---|---|---|---|---|---|---|
| | Type | Amount | Type | Amount | | |
| 22 | 31 | 4 | diethylene glycol | 30 | Surfynol 465 | present invention |
| 23 | 32 | 3 | N-methyl-2-pyrrolidone | 30 | Surfynol 465 | present invention |
| 24 | 33 | 3 | N,N-dimethyl-acetamide | 30 | Surfynol 465 | present invention |
| 25 | 35 | 3 | N-methyl-2-pyrrolidone | 30 | Surfynol 465 | present invention |
| 26 | 36 | 2 | N-methyl-2-pyrrolidone | 30 | Surfynol 465 | present invention |
| 27 | 37 | 2 | N-methyl-2-pyrrolidone | 30 | Surfynol 465 | present invention |
| 28 | comparative pigment 1 | 4 | diethylene glycol | 20 | | comparative |
| 29 | comparative dye 2 | 2 | diethylene glycol | 20 | Surfynol 465 | comparative |

Comparative pigment 1: Pigment Red 4,
Comparative dye 2: Acid Yellow 23

Example 2

Preparation of Image 1

An image sample was obtained by printing an image on plain paper (Xerox 4024) employing Ink Sample 13 (red ink), while employing an Ink Jet Printer MJ-810 (manufactured by Seiko Epson Corporation).

After 10 percent aqueous sodium carbonate solution was applied onto the resultant sample, and subsequently dried, the resultant sample was subjected to treatment employing a electrophotographic heated fixing roller set at 180° C., and Image Sample 1, having a blue tinted image, was obtained. The obtained Image 1 was one of those which were subjected to conversion to an insoluble pigment.

Preparation of Image Sample 2

An image sample was obtained by printing an image on plain paper (Xerox 4024) employing Ink Sample 13 (red ink), while employing an Ink Jet Printer BJC700J (manufactured by Canon Inc.).

At the time, a water resistance enhancing agent for plain paper was replaced with 10 percent aqueous sodium carbonate solution so that said 10 percent aqueous sodium carbonate solution is blended with an Ink 13 image on the plain paper.

The resultant sample was subjected to treatment employing an electrophotographic heated fixing roller set at 180° C. to obtain blue tinted Image 2. The obtained Image 2 was one which was subjected to conversion to the insoluble pigment.

Preparation of Image 3

An image sample was obtained by printing an image on plain paper (Xerox 4024) employing Ink Sample 7 (yellowish green ink), while employing an Ink Jet Printer MJ-810 (manufactured by Seiko Epson Corporation).

After 10 percent aqueous sodium carbonate solution was applied onto the resultant sample employing a wire bar, the coating was dried employing heated forced air (at 100° C.) to obtain reddish violet Image 3. Obtained Image 3 was one of those which were subjected to conversion to the insoluble pigment.

Preparation of Image 4

An image sample was obtained by printing an image on special glossy paper (Photo Jet Paper QP Double Weight, manufactured by Konica Corp.) employing Ink Sample 13 (red ink), while employing an Ink Jet Printer MJ-810 (manufactured by Seiko Epson Corporation).

After 10 percent aqueous sodium carbonate solution was applied onto the resultant sample employing a wire bar, and subsequently dried, the resultant sample was subjected to treatment employing an electrophotographic heated fixing roller set at 180° C., and blue tinted Image Sample 4 was obtained. The obtained Image 4 was one of those which were subjected to conversion to an insoluble pigment.

Preparation of Image 5

An image sample was obtained by printing an image on special glossy paper (Photo Jet Paper QP Double Weight, manufactured by Konica Corp.) employing Ink Sample 13 (red ink), while employing an Ink Jet Printer MJ-810 (manufactured by Seiko Epson Corporation).

After 10 percent aqueous sodium carbonate solution was applied onto the resultant sample employing a wire bar, and subsequently dried, the resultant sample was dried with forced hot air (at about 80° C.) for one minute employing a dryer to obtain blue tinted Image 5. The obtained Image 5 was one of those which were subjected to conversion to an insoluble pigment.

Preparation of Image 6

An image sample was obtained by printing an image on special glossy paper (Photo Jet Paper QP Double Weight, manufactured by Konica Corp.) which was previously coated with 10 percent aqueous sodium carbonate solution employing a wire bar, and subsequently dried, employing Ink Sample 13 (red ink), while employing an Ink Jet Printer MJ-810 (manufactured by Seiko Epson Corporation).

The resultant sample was subjected to treatment employing an electrophotographic heated fixing roller, set at 180° C., to obtain blue tinted Image Sample 6. The obtained Image 6 was one of those which were subjected to conversion to an insoluble pigment.

Preparation of Image 7

Image 7 was obtained by printing an image on plain paper (Xerox 4024) employing Ink Sample 28 (comparative pigment ink), while employing an Ink Jet Printer MJ-810 (manufactured by Seiko Epson Corporation).

Preparation of Image 8

Image 8 was obtained by printing an image on plain paper (Xerox 4024) employing Ink Sample 29 (comparative dye ink), while employing an Ink Jet Printer MJ-810 (manufactured by Seiko Epson Corporation.).

Preparation of Images 9 through 22

Images 9 through 22 were prepared in the same manner as Image 5, except that Ink Sample 13 employed to prepare Image 5 was replaced with each of Ink Samples 1, 2, 3, 4, 5, 6, 7, 8, 9, 10, 11, 12, 14, and 15. All obtained Images 9 through 22 were ones which were subjected to conversion to an insoluble pigment.

Preparation of Image 23

An image sample was obtained by printing an image on special glossy paper (Photo Jet Paper QP Double Weight, manufactured by Konica Corp.) employing Ink Sample 17 (yellow ink), while employing an Ink Jet Printer MJ-810 (manufactured by Seiko Epson Corporation). The resultant sample was coated with an aqueous sulfuric acid solution diluted by a factor of 50, employing a wire bar, and subsequently dried. Thereafter the dried sample was subjected to treatment employing an electrophotographic heated fixing roller set at 180° C. to obtain magenta Image 23. Obtained Image 23 was one of those which were subjected to conversion to an insoluble pigment.

Preparation of Image 24

An image sample was obtained by printing an image on special glossy paper (Photo Jet Paper QP Double Weight, manufactured by Konica Corp.) employing Ink Sample 17 (yellow ink), while employing an Ink Jet Printer MJ-810 (manufactured by Seiko Epson Corporation.). The resultant sample was coated with a 10 percent aqueous p-toluenesulfonic acid solution employing a wire bar, and subsequently dried. Thereafter the dried sample was subjected to treatment employing an electrophotographic heated fixing roller set at 180° C. to obtain magenta Image 24. Obtained Image 24 was one of those which were subjected to conversion to the insoluble pigment.

Preparation of Image 25

An image sample was obtained by printing an image on special glossy paper (Photo Jet Paper QP Double Weight, manufactured by Konica Corp.), which had been coated with a 10 percent aqueous p-toluenesulfonic acid solution and subsequently dried, employing Ink Sample 17 (yellow ink), while employing an Ink Jet Printer MJ-810 (manufactured by Seiko Epson Corporation). The resultant sample was coated with a 10 percent aqueous p-toluenesulfonic acid solution employing a wire bar, and subsequently dried. Thereafter, the obtained sample was subjected to treatment employing an electrophotographic heated fixing roller set at 180° C. to obtain magenta Image 25. Obtained Image 25 was one of those which were subjected to conversion to an insoluble pigment.

Preparation of Images 26 through 33

Images 26 through 33 were prepared in the same manner as Image 23, except that Ink Sample 17 employed to prepare Image 23 was replaced with each of Ink Samples 16, 18, 19, 20, 21, 22, 23, and 27. All obtained Images 26 through 33 were those which were subjected to conversion to an insoluble pigment.

Preparation of Image 34

Image 34 was obtained by printing an image on special glossy paper (Photo Jet Paper QP Double Weight, manufactured by Konica Corp.) employing Ink Sample 28 (comparative pigment ink), while employing an Ink Jet Printer MJ-810 (manufactured by Seiko Epson Corporation).

Preparation of Image 35

Image 35 was obtained by printing an image on special glossy paper (Photo Jet Paper QP Double Weight, manufactured by Konica Corp.) employing Ink Sample 29 (comparative dye ink), while employing an Ink Jet Printer MJ-810 (manufactured by Seiko Epson Corporation).

Example 3

Light fastness, as an image retention quality, as well as the bleeding of Images 1, 2, 3, 7, and 8, which were obtained by printing an image on plain paper, was evaluated as described below. Table 3 shows the obtained results.

The color of the images of the present invention was in no way inferior to that prepared by dye ink, and the image quality was improved compared to comparative Image 7.

<<Evaluation of Light Fastness>>

A sample having a reflection density of about 1.0 was irradiated (70,000 Lx and 400 hours), employing a Xe fademeter. The residual ratio of the reflection density was calculated by the formula described below, and was evaluated based on the criteria described below.

Reflection density residual ratio (in percent)=[(reflection density after Xe irradiation)/(reflection density prior to Xe irradiation)]×100

<Evaluation Criteria>

A: Reflection density residual ratio was at least 90 percent
B: Reflection density residual ratio was 70 to less than 90 percent
C: Reflection density residual ratio was less than 70 percent <<Evaluation of Bleeding>>

An image sample was stored at an ambience of 60° C. and relative humidity of 80 percent for 30 days, and bleeding of fine lines having a width of 1 mm was visually evaluated based on the criteria described below.

<Evaluation Criteria>

A: The increase in line width due to bleeding was less than 5 percent.
B: The increase in line width due to bleeding was 5 to less than 10 percent.
C: The increase in line width due to bleeding was at least 10 percent.

TABLE 3

| Image | Light Fastness | Bleeding | |
|---|---|---|---|
| 1 | A | A | present invention |
| 2 | A | A | present invention |
| 3 | A | A | present invention |
| 7 | B | B | comparative |
| 8 | C | C | comparative |

Example 4

The light fastness, as image retention quality, as well as the bleeding of Images 4, 5, 6, 9, 10, 11, 12, 13, 14, 15, 16, 17, 18, 19, 20, 21, 22, 23, 26, 27, 28, 29, 30, 31, 32, 33, 34, and 35, which were obtained by printing an image on special glossy paper, was evaluated in the same way as Example 3.

Further, glossiness as well as bronzing as an image quality was visually evaluated based on the evaluation criteria described below. Tables 4 and 5 show the obtained results.

<<Evaluation of Glossiness>>
  <Evaluation criteria>
A: Glossiness of the image area was the same as the non-image area.
B: Glossiness of the image area was clearly inferior to the non-image area.

<<Evaluation of Bronzing>>
  <Evaluation Criteria>
A: Metallic gloss was not observed on the image
B: Metallic gloss was observed on the image.

TABLE 4

|  | Image Quality | | Image Retention | | |
|---|---|---|---|---|---|
| Image | Glossiness | Bronzing | Light Fastness | Bleeding | |
| 4 | A | A | A | A | present invention |
| 5 | A | A | A | A | present invention |
| 6 | A | A | A | A | present invention |
| 9 | A | A | A | A | present invention |
| 10 | A | A | A | A | present invention |
| 11 | A | A | A | A | present invention |
| 12 | A | A | A | A | present invention |
| 13 | A | A | A | A | present invention |
| 14 | A | A | A | A | present invention |
| 15 | A | A | A | A | present invention |
| 16 | A | A | A | A | present invention |
| 17 | A | A | A | A | present invention |
| 18 | A | A | A | A | present invention |
| 19 | A | A | A | A | present invention |
| 20 | A | A | A | A | present invention |
| 21 | A | A | A | A | present invention |
| 22 | A | A | A | A | present invention |
| 23 | A | A | A | A | present invention |
| 26 | A | A | A | A | present invention |
| 27 | A | A | A | A | present invention |
| 28 | A | A | A | A | present invention |
| 29 | A | A | A | A | present invention |
| 30 | A | A | A | A | present invention |
| 31 | A | A | A | A | present invention |
| 32 | A | A | A | A | present invention |

TABLE 5

|  | Image Quality | | Image Retention | | |
|---|---|---|---|---|---|
| Image | Glossiness | Bronzing | Light Fastness | Bleeding | |
| 33 | A | A | A | A | present invention |
| 34 | C | C | B | B | comparative example |
| 35 | A | A | C | C | comparative example |

Example 5

Storage Stability of Ink

Images were obtained by printing an image on plain paper (Xerox 4024), employing each of Ink Samples of 1 through 27, Comparative Pigment Ink 28, and Comparative Dye Ink 29, prepared in Example 1, which had been stored at 60° C. for 60 days, while employing an Ink Jet Printer MJ-810 (manufactured by Seiko Epson Corporation).

The image obtained by printing employing Comparative Pigment Ink Sample 28 resulted in many streaked image problems. By contrast, the images obtained by printing employing Ink Samples 1 through 27 after the storage resulted in no image problems, in the same manner as images obtained by printing employing Ink Samples 1 through 1 to 27 before the storage.

Preparation of Ink

Ink Nos. 1 through 4 were prepared by mixing a colorant, a solvent and an additive as shown in Table 1 in an amount, also shown in Table 1, followed by adjusting the total to 100 parts by adding deionized water.

TABLE 1

| No. | Colorant | Solvent | | Additive | |
|---|---|---|---|---|---|
| 1 | Exemplified 20 (1.5 parts) | DMAc (40 parts) | | A19 (1.3 parts) | Surfynol 465 (0.1 part) |
| 2 | Exemplified 20 (1.5 parts) | DMAc (40 parts) | | | Surfynol 465 (0.1 part) |
| 3 | Exemplified 26 (2 parts) | DEG (15 parts) | GLY (15 parts) | A1 (6 parts) | Surfynol 465 (0.1 part) |
| 4 | Exemplified 25 (2 parts) | DEG (15 Parts) | GLY (15 parts) | | Surfynol 465 (0.1 part) |

DMAc: N,N-dimethylacetoamide
DEG: ethylene glycol
GLY: glycerin

<<Preparation of Recording Media>>

Preparation of Recording Media 1

| Zinc oxide | 100 weight parts |
|---|---|
| Polyvinyl alcohol | 25 weight parts |
| SBR latex | 6 weight parts |
| Water | 600 weight parts | were blended. The resultant blend was applied onto a paper support (having a thickness of 240 μm) laminated on both side with pollyethylene, employing a blade coater, and subsequently dried at 70 C., whereby Recording Medium 1 was prepared.

Preparation of Recording Medium 2

Recording Medium 2 was prepared by applying a coating mix having the composition described below onto a paper support (having a thickness of 240 μm) laminated on both sides with polyethylene, and subsequently drying the coating at 70° C.

| Acid process gelatin | 6 g/m$^2$ |
|---|---|
| Polyvinyl alcohol | 4 g/m$^2$ |
| Zinc hydroxide | 6 g/m$^2$ |
| Surface Active Agent 1 | 0.04 g/m$^2$ |

Incidentally, hardening was carried out employing Gelatin Hardener 1.

Preparation of Recording Medium 3

Photo Jet Paper QP Double Weight manufactured by Konica Corp. was coated with a 30 percent aqueous zinc sulfate heptahydrate solution employing a wire bar, and subsequently dried at room temperature employing forced air.

Surface Active Agent 1

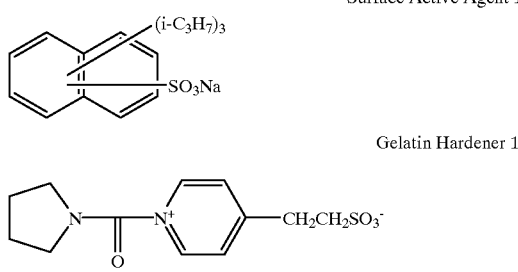

Gelatin Hardener 1

<<Preparation of Images>>

Preparation of Image 1

After recording was carried out onto Recording Medium 1 employing Ink No. 1 (red ink), while employing an Ink Jet Printer MJ-810 (manufactured by Seiko Epson Corporation), the resultant Medium 1 was processed, employing an electrophotographic heated fixing roller set at 150° C., whereby Image 1 was prepared. The resultant image was blue. Thus it was found that conversion to an insoluble pigment was carried out.

Preparation of Image 2

After the entire surface of Recording Medium 2 was recorded employing 5 percent aqueous A-1 solution, while employing an Ink Jet Printer MJ-810 (manufactured by Seiko Epson Corporation), the resultant Medium 2 was dried by 100° C. forced air. Then recording was carried out employing Ink No. 2, while employing said printer. Thereafter, the printed medium was thermally treated, employing 100° C. forced air, whereby Image 2 was prepared. The obtained image was blue. Thus it was found that conversion to an insoluble pigment was carried out.

Preparation of Image 3

After recording was carried out onto Recording Medium 3 employing Ink No. 3 (yellow), while employing an Ink Jet Printer PM770 (manufactured by Seiko Epson Corporation), the resultant Medium 3 was processed employing an electrophotographic heated fixing roller set at 150° C., to obtain a magenta image, which was found to be an image subjected to conversion to an insoluble pigment.

Preparation of Image 4

After the entire surface of Recording Medium 4 was recorded employing 15 percent aqueous picolinic acid (A1) solution, while employing an Ink Jet Printer PM770 (manufactured by Seiko Epson Corporation), the resultant Medium 4 was dried by 100° C. forced air heated to obtain a magenta image. It was found that the obtained Image 4 was one in which conversion to an insoluble pigment was carried out.

The image quality as well as image retention of obtained Images 1 through 4 was evaluated. The evaluation results are described below.

| | Image Quality | | Image Retention | | | |
|---|---|---|---|---|---|---|
| Image No. | Glossiness | Bronzing | Light Fastness | Bleeding | Chemical Means | |
| 1 | A | A | A | A | base generation | Inventive |
| 2 | A | A | A | A | base generation | Inventive |

-continued

| | Image Quality | | Image Retention | | | |
|---|---|---|---|---|---|---|
| Image No. | Glossiness | Bronzing | Light Fastness | Bleeding | Chemical Means | |
| 3 | A | A | A | A | acid generation | Inventive |
| 4 | A | A | A | A | acid generation | Inventive |

The storage stability of ink was evaluated as described below.

<<Evaluation of Storage Stability of Ink>>

After storing the prepared ink at 60° C. for 60 days, recording was carried out onto plain paper (Xerox 4024) employing the resultant ink, while employing an Ink Jet Printer MJ-810 (manufactured by Seiko Epson Corporation). Images prepared employing stored Ink Nos. 1 through 4 resulted in no image problem in the same manner as those prepared employing Ink Nos. 1 through 4 before storage.

Images 3 and 4 were rinsed in pure water for 15 seconds. It was found that the pH of the resultant rinse solution varied to be in the weak acidic region and some of the acid was released from each image. Thereafter, each image was obtained by forced air drying. The pH of the layer surface of the image was measured and was found about 4.9. The resultant image was compared to one prior to said treatment and resulted in no bleeding, no degradation in hue, no decrease in density, and also no degradation of image retention quality.

The water based ink composition of the present invention exhibits excellent storage stability of ink, and images obtained by the image forming method of the present invention, employing the water based ink composition of the present invention, exhibits improved image quality (glossiness and bronzing formation) compared to conventional pigment ink images, and also exhibits excellent image quality approaching dye image quality. Further, said image exhibits excellent image fastness and bleeding) which approaches conventional pigment ink images.

What is claimed is:

1. A water based ink composition comprising water based solvent and a precursor dissolved in the water based solvent, wherein the precursor is a compound which can be converted to an insoluble pigment by at least one means selected from the group consisting of a chemical means which is an acid, a chemical means which is a base, a thermal means, a photodecomposition means, and a radiation means.

2. The water based ink composition of claim 1, wherein the precursor is a compound represented by General Formula (1):

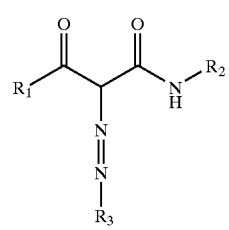

General Formula (1)

wherein $R_1$ represents an alkyl group or an aryl group which may have a substituent, $R_2$ represents a phenyl group which may have a substituent, and $R_3$ represents a phenyl group which may have a substituent, with proviso that, at least one of $R_1$, $R_2$, and $R_3$ is a group represented by General Formulas General Formula (2)

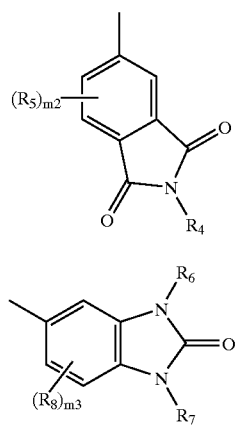

General Formula (3)

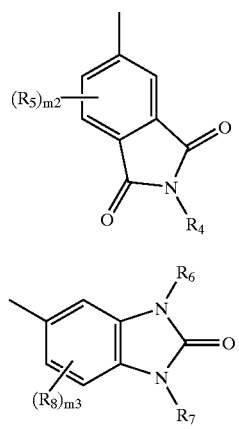

wherein $R_4$ represents a substituent having a water solubilizing group, $R_5$ represents a substituent, and $m_2$ represent 0 to 3, $R_6$ and $R_7$ each represent a substituent having a water solubilizing group, $R_8$ represents a substituent, and $m_3$ represents 0 to 3.

3. The water based ink composition of claim 1, wherein the precursor is a compound represented by General Formula (4):

General Formula (4)

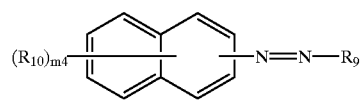

wherein $R_9$ represents a phenyl group which may have a substituent, $R_{10}$ represents a hydroxyl group, or an amino group, an acylamino group or a carbamoyl group which may have a substituent, and $m_4$ represents 0 to 7, with proviso that, at least one substituent of $R_9$ or $R_{10}$ is a group represented by General Formula (2) or General Formula (3), General Formula (2)

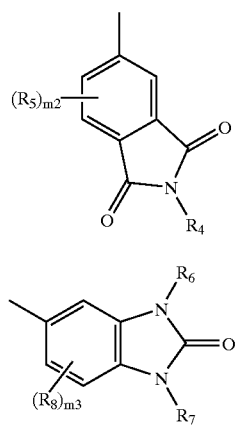

General Formula (3)

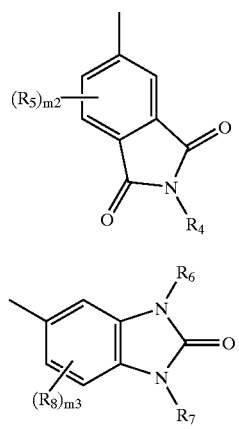

General Formula (2)

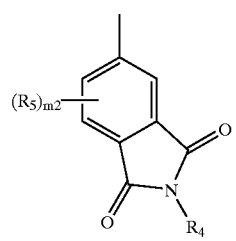

General Formula (3)

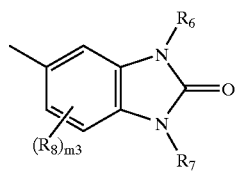

wherein each of $R_4$, $R_6$ and $R_7$ represents a substituent having a water solubilizing group, each of $R_5$ and $R_8$ represents a substituent, and $m_2$ represents 0 to 3, or at least one of $R_9$ and $R_{10}$ is a group represented by General Formula (2) or (3).

4. The water based ink composition of claim 1, wherein the precursor is a compound represented by General Formula (5):

General Formula (5)

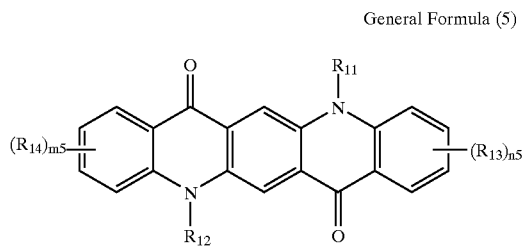

wherein $R_{11}$ and $R_{12}$ each represent a substituent having a water solubilizing group, $R_{13}$ and $R_{14}$ each represent a substituent, and $n_5$ and $m_5$ each represent 0 to 4.

5. The water based ink composition of claim 1, wherein the precursor is a compound represented by General Formula (6):

General Formula (6)

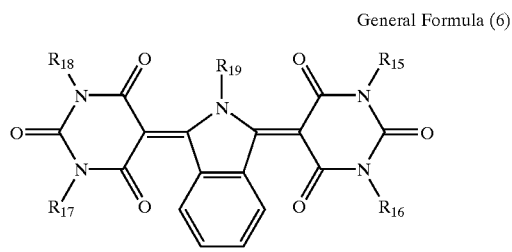

wherein $R_{15}$, $R_{16}$, $R_{17}$, $R_{,8}$, and $R_{19}$ each represent a hydrogen atom or a substituent having a water solubilizing group, with proviso that, at least two of $R_{15}$, $R_{16}$, $R_{17}$, $R_{18}$, or $R_{19}$ are substituents having a water solubilizing group.

6. The water based ink composition of claim 1, wherein the precursor is a compound represented by General Formula (7):

General Formula (7)

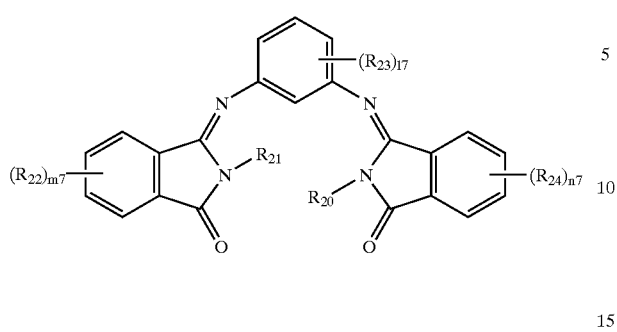

wherein $R_{20}$ and $R_{21}$ each represent a substituent having a water solubilizing group, $R_{22}$, $R_{23}$, and $R_{24}$ each represent a substituent, and $m_7$, $l_7$, and $n_7$ each represent 0 to 4.

7. The water based ink composition of claim 1, wherein the precursor is the compound represented by General Formula (8):

General Formula (8)

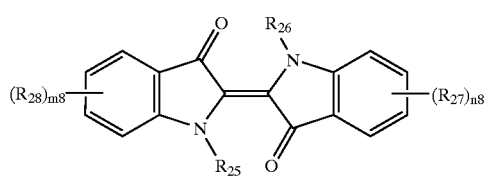

wherein $R_{25}$ and $R_{26}$ each represent a substituent having a water solubilizing group, $R_{27}$, and $R_{28}$ each represent a substituent, and $m_8$ and $n_8$ each represent 0 to 4.

8. The water based ink composition of claim 1, wherein the precursor is a compound represented by General Formula (9):

General Formula (9)

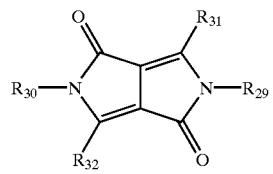

wherein $R_{29}$ and $R_{30}$ each represent a substituent having a water solubilizing group, and $R_{31}$ and $R_{32}$ each represents a hydrogen atom or a substituent.

9. The water based ink composition of claim 1, wherein the precursor is a compound represented by General Formula (10):

General Formula (10)

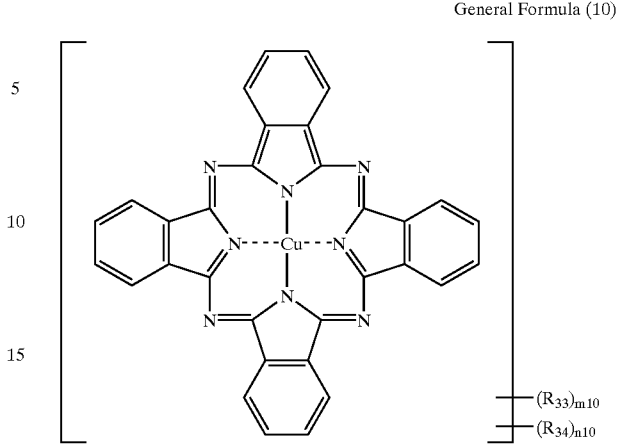

wherein $R_{33}$ represents a substituent having a water solubilizing group, and $R_{34}$ represents a substituent, $m_{10}$ represents 1 to 8 and $n_{10}$ represents 0 to 8.

10. The water based ink composition of claim 1, wherein the precursor is a compound represented by General Formula (11):

General Formula (11)

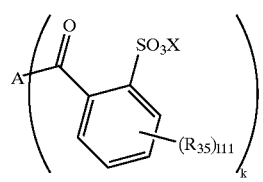

wherein A represents an insoluble pigment residual group containing a nitrogen atom, and the nitrogen atom bonds to the group in the parenthesis; X represents a hydrogen atom or a counter cation; $R_{35}$ represents a substituent; and $l_{11}$ represents 0 to 4, and a plurality of $R_{35}$ may be joined together to form a ring when $l_{11}$ is 2 to 4, and k represents 1 to 5.

11. A water based ink composition comprising at least one of compounds represented by Formula (1) and (4) through (11):

General Formula (1)

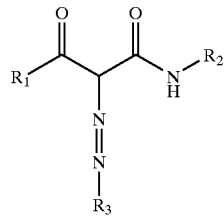

wherein $R_1$ represents an alkyl group or an aryl group which may have a substituent, $R_2$ represents a phenyl group which may have a substituent, and $R_3$ represents a phenyl group which may have a substituent, with proviso that, at least one of $R_1$, $R_2$, and $R_3$ is a group represented by General Formulas (2) or (3):

General Formula (2)

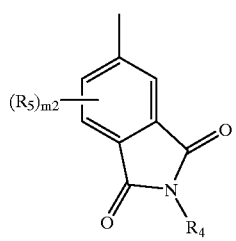

General Formula (6)

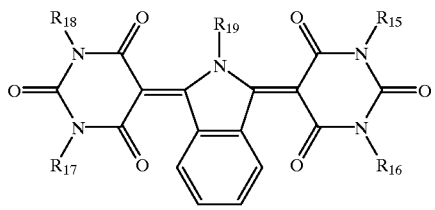

wherein $R_{15}$, $R_{16}$, $R_{17}$, $R_{18}$, and $R_{19}$ each represent a hydrogen atom or a substituent having a water solubilizing group, with proviso that, at least two of $R_{15}$, $R_{16}$, $R_{17}$, $R_{18}$, or $R_{19}$ are substituents having a water solubilizing group, General Formula (3)

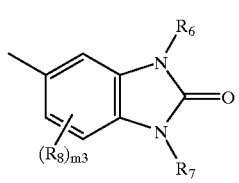

wherein $R_4$ represents a substituent having a water solubilizing group, $R_5$ represents a substituent, and $m_2$ represent 0 to 3, $R_6$ and $R_7$ each represent a substituent having a water solubilizing group, $R_8$ represents a substituent, and M3 represents 0 to 3, General Formula (7)

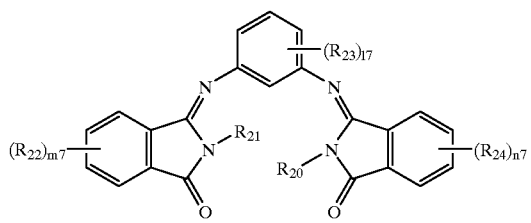

wherein $R_{20}$ and $R_{21}$ each represent a substituent having a water solubilizing group, $R_{22}$, $R_{23}$, and $R_{24}$ each represent a substituent, and $m_7$, $l_7$, and $n_7$ each represent 0 to 4, General Formula (4)

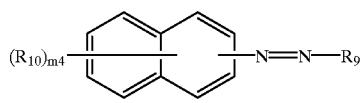

wherein $R_9$ represents a phenyl group which may have a substituent, $R_{10}$ represents a hydroxyl group, or an amino group, an acylamino group or a carbamoyl group which may have a substituent, and m4 represents 0 to 7, with proviso that, at least one substituent of $R_9$ or $R_{10}$ is a group represented by General Formula (2) or General Formula (3), or at least one of $R_9$ and $R_{10}$ is a group represented by the General Formula (2) or (3), General Formula (8)

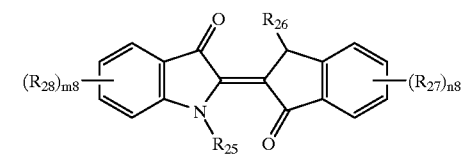

wherein $R_{25}$ and $R_{26}$ each represent a substituent having a water solubilizing group, $R_{27}$ and $R_{28}$ each represent a substituent, and $m_8$ and $n_8$ each represent 0 to 4, General Formula (5)

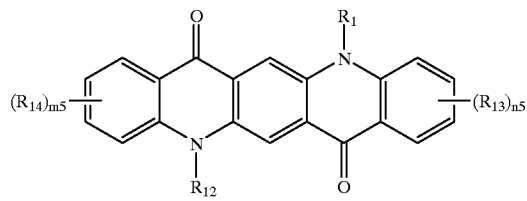

General Formula (9)

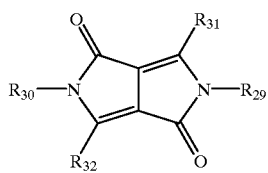

wherein $R_{11}$ and $R_{12}$ each represent a substituent having a water solubilizing group, $R_{13}$ and $R_{14}$ each represent a substituent, $n_5$ and $m_5$ each represent 0 to 4, wherein $R_{29}$ and $R_{30}$ each represent a substituent having a water solubilizing group, and $R_{31}$ and $R_{32}$ each represent a hydrogen atom or a substituent, General Formula (10)

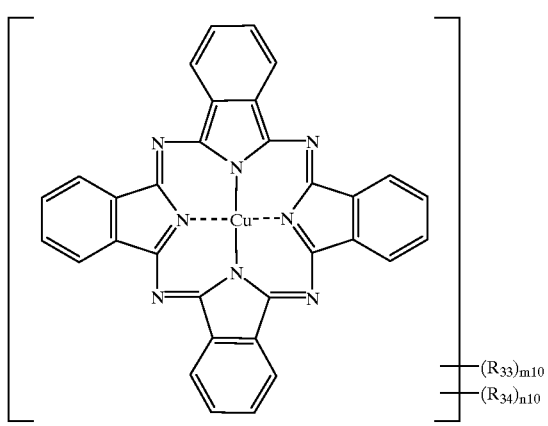

wherein $R_{33}$ represents a substituent having a water solubilizing group, $R_{34}$ represents a substituent, and $m_{10}$ represents 0 to 8, while $n_{10}$ represents 0 to 8, General Formula (11)

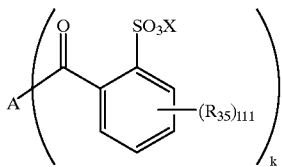

wherein A represents an insoluble pigment residual group containing a nitrogen atom and the nitrogen atom bonds to the group in the parenthesis, X represents a hydrogen atom or a counter cation, $R_{35}$ represents a substituent, and $l_{11}$ represents 0 to 4, and when $l_{11}$ is 2 to 4, a plurality of $R_{35}$ may be joined together to form a ring and k represents 1 to 5.

12. The water based ink composition of claim 11, containing at least one of compounds represented by Formula (1), (4), (5), (9), (10) and (11).

13. The water based ink composition of claim 11, containing at least one of compounds represented by Formula (1), (4), (5), (10) and (11).

14. The water based ink composition of claim 11, wherein the compound is contained in an amount of 0.5 to 10 weight % based on the water based ink composition.

15. The water based ink composition of claim 11 having viscosity of not more than 40 cps.

16. The water based ink composition of claim 11 having a surface tension of at least 20 mN/n.

17. The water based ink composition of claim 11, wherein the water based solvent contains an organic solvent in an amount of 5 to 60 weight % based on the water based ink composition.

18. The water based ink composition of claim 13 having viscosity of not more than 40 cps and a surface tension of at least 20 mN/n, wherein the water based solvent contains an organic solvent in an amount of 5 to 60 weight % based on the water based ink composition, and the compound is contained in an amount of 0.5 to 10 weight % based on the water based ink composition.

19. An image forming method comprising steps of drawing image on a print medium with the water based ink composition of claim 1, converting the precursor on said print medium to an insoluble pigment by at least one converting means selected from the group consisting of a chemical means which is an acid, a chemical means which is a base, a thermal means, a photodecomposition means, and a radiation means.

20. The image forming method of claim 19, wherein the converting means is the chemical means in combination with the thermal means, and the chemical means is a means in which an acid is employed as an acting component.

21. A water based ink composition of claim 1, wherein the precursor is a compound which can be converted to an insoluble pigment by a chemical means which is an acid.

* * * * *